US010120804B2

(12) United States Patent
Gschwind et al.

(10) Patent No.: US 10,120,804 B2
(45) Date of Patent: *Nov. 6, 2018

(54) HYBRID TRACKING OF TRANSACTION READ AND WRITE SETS

(71) Applicant: International Business Machines Corporation, Armonk, NY (US)

(72) Inventors: Michael Karl Gschwind, Chappaqua, NY (US); Valentina Salapura, Chappaqua, NY (US); Chung-Lung K. Shum, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/593,995

(22) Filed: May 12, 2017

(65) Prior Publication Data

US 2017/0249154 A1    Aug. 31, 2017

Related U.S. Application Data

(63) Continuation of application No. 14/831,475, filed on Aug. 20, 2015, now Pat. No. 9,684,599, which is a
(Continued)

(51) Int. Cl.
*G06F 12/08*    (2016.01)
*G06F 12/0831*    (2016.01)
(Continued)

(52) U.S. Cl.
CPC ........ *G06F 12/0833* (2013.01); *G06F 9/3004* (2013.01); *G06F 9/30043* (2013.01);
(Continued)

(58) Field of Classification Search
None
See application file for complete search history.

(56) References Cited

U.S. PATENT DOCUMENTS 4,879,646 A    11/1989 Iwasaki et al.
5,155,843 A    10/1992 Stamm et al.
(Continued)

OTHER PUBLICATIONS

Hung et al., ASF: AMD64 Extension for Lock-free Data Structures and Transactional Memory, MICRO '43 Proceedings of the 2010 43rd Annual IEEE/ACM International Symposium on Microarchitecture pp. 39-50.
(Continued)

*Primary Examiner* — Mano Padmanabhan
*Assistant Examiner* — Jean C Edouard
(74) *Attorney, Agent, or Firm* — Lieberman & Brandsdorfer, LLC

(57) ABSTRACT

Tracking a processor instruction is provided to limit a speculative mis-prediction. A non-speculative read set indication and/or write set indication are maintained for a transaction. The indication(s) are stored in cache. In addition, a queue(s) of at least one address corresponding to a speculatively executed instruction is maintained. For a received request from a processor, a transaction resolution process takes place, and a resolution is performed if an address match in the queue is detected. The resolution includes to hold a response to the receive request until the speculative instruction is committed or flushed.

18 Claims, 15 Drawing Sheets

Related U.S. Application Data continuation of application No. 14/748,440, filed on Jun. 24, 2015, now Pat. No. 9,858,189.

(51) Int. Cl.

| | | |
|---|---|---|
| *G06F 9/52* | (2006.01) | |
| *G06F 12/128* | (2016.01) | |
| *G06F 12/123* | (2016.01) | |
| *G06F 9/46* | (2006.01) | |
| *G06F 9/30* | (2018.01) | |
| *G06F 9/38* | (2018.01) | |
| *G06F 12/0875* | (2016.01) | |
| *G06F 12/0817* | (2016.01) | |

(52) U.S. Cl.
CPC ...... *G06F 9/30087* (2013.01); *G06F 9/30145* (2013.01); *G06F 9/3834* (2013.01); *G06F 9/3859* (2013.01); *G06F 9/3865* (2013.01); *G06F 9/467* (2013.01); *G06F 9/528* (2013.01); *G06F 12/0875* (2013.01); *G06F 12/123* (2013.01); *G06F 12/128* (2013.01); *G06F 12/0817* (2013.01); *G06F 2212/1016* (2013.01); *G06F 2212/452* (2013.01); *G06F 2212/621* (2013.01); *G06F 2212/69* (2013.01)

(56) References Cited

U.S. PATENT DOCUMENTS

| | | | |
|---|---|---|---|
| 6,038,651 A | 3/2000 | VanHuben et al. | |
| 6,654,860 B1 | 11/2003 | Strongin et al. | |
| 6,681,293 B1* | 1/2004 | Solomon | G06F 12/0811 |
| | | | 711/120 |
| 6,721,874 B1 | 4/2004 | Le et al. | |
| 7,089,374 B2 | 8/2006 | Tremblay et al. | |
| 7,478,225 B1 | 1/2009 | Brooks et al. | |
| 7,730,265 B1 | 6/2010 | Cypher et al. | |
| 8,661,204 B2 | 2/2014 | Dwarkadas et al. | |
| 2002/0069326 A1 | 6/2002 | Richardson et al. | |
| 2002/0129226 A1* | 9/2002 | Eisen | G06F 9/3806 |
| | | | 712/228 |
| 2006/0112261 A1 | 5/2006 | Yourst et al. | |
| 2006/0179174 A1* | 8/2006 | Bockhaus | G06F 12/126 |
| | | | 710/22 |
| 2007/0005934 A1* | 1/2007 | Rotithor | G06F 12/0862 |
| | | | 711/213 |
| 2007/0101105 A1* | 5/2007 | Diefendorff | G06F 12/0862 |
| | | | 712/225 |
| 2007/0113020 A1* | 5/2007 | Gunna | G06F 9/30047 |
| | | | 711/141 |
| 2007/0198781 A1* | 8/2007 | Dice | G06F 9/466 |
| | | | 711/145 |
| 2008/0005332 A1* | 1/2008 | Pande | G06F 9/4843 |
| | | | 709/226 |
| 2008/0163220 A1 | 7/2008 | Wang et al. | |
| 2008/0256074 A1* | 10/2008 | Lev | G06F 9/466 |
| 2009/0106499 A1* | 4/2009 | Aoki | G06F 12/0862 |
| | | | 711/137 |
| 2009/0172305 A1* | 7/2009 | Shpeisman | G06F 9/3834 |
| | | | 711/154 |
| 2009/0198969 A1 | 8/2009 | Nystad et al. | |
| 2010/0332765 A1* | 12/2010 | Cypher | G06F 12/0811 |
| | | | 711/141 |
| 2010/0332787 A1* | 12/2010 | Grohoski | G06F 12/1027 |
| | | | 711/207 |
| 2011/0099335 A1* | 4/2011 | Scott | G06F 12/0842 |
| | | | 711/141 |
| 2011/0219208 A1* | 9/2011 | Asaad | G06F 15/76 |
| | | | 712/12 |
| 2011/0307689 A1* | 12/2011 | Chung | G06F 9/3004 |
| | | | 712/234 |
| 2011/0320776 A1 | 12/2011 | Welc et al. | |
| 2012/0072668 A1 | 3/2012 | Chirca et al. | |
| 2012/0240119 A1 | 9/2012 | Xie et al. | |
| 2013/0013862 A1* | 1/2013 | Kannan | A61B 5/0538 |
| | | | 711/119 |
| 2013/0024625 A1* | 1/2013 | Benhase | G06F 12/0862 |
| | | | 711/136 |
| 2014/0006698 A1 | 1/2014 | Chappell et al. | |
| 2014/0040554 A1* | 2/2014 | Pohlack | G06F 12/1441 |
| | | | 711/130 |
| 2014/0075121 A1 | 3/2014 | Blundell et al. | |
| 2014/0089599 A1* | 3/2014 | Okawara | G06F 9/3017 |
| | | | 711/140 |
| 2014/0379996 A1 | 12/2014 | Rajwar et al. | |

OTHER PUBLICATIONS

Porter et al., Mapping Out a Path from Hardware Transactional Memory to Speculative Multithreading, In Proceedings of the 18th International Conference on Parallel Architectures and Compilation Techniques (PACT 2009), pp. 313-324.

List of IBM Patents or Applications Treated as Related, May 2017.

* cited by examiner

HYBRID TRACKING OF TRANSACTION READ AND WRITE SETS

CROSS REFERENCE TO RELATED APPLICATION(S)

This application is a continuation patent application claiming the benefit of the filing date of U.S. patent application Ser. No. 14/831,475 filed Aug. 20, 2015 and titled "Hybrid Tracking of Transaction Read and Write Sets" now pending, which is continuation patent application claiming the benefit of the filing data of U.S. patent application Ser. No. 14/748,440 filed on Jun. 24, 2015 and titled "Hybrid Tracking of Transaction Read and Write Sets" now pending, both of which is hereby incorporated by reference.

BACKGROUND

The present embodiments relate to transactional execution and tracking of memory data. More specifically, the embodiments relate to tracking processor transactional read and write sets to eliminate speculative mis-predictions.

The number of central processing unit (CPU) cores on a chip and the number of CPU cores connected to a shared memory continues to grow significantly to support growing workload capacity demand. The increasing number of CPUs cooperating to process the same workloads puts a significant burden on software scalability. For example, shared queues or data-structures protected by traditional semaphores become hot spots and lead to sub-linear n-way scaling curves. Traditionally this has been countered by implementing finer-grained locking in software, and with lower latency/higher bandwidth interconnects in hardware. Implementing fine-grained locking to improve software scalability can be very complicated and error-prone, and at today's CPU frequencies, the latencies of hardware interconnects is limited by the physical dimension of the chips and systems, and by the speed of light.

Implementations of hardware Transactional Memory (TM) have been introduced, wherein a group of instructions, called a transaction, operate atomically and in isolation (sometimes called "serializability") on a data structure in memory. The transaction is a sequence of instructions that appears as if they have all been executed without any intervening interaction with another processor. The transaction executes optimistically without obtaining a lock, but may need to abort and retry the transaction execution if an operation, of the executing transaction, on a memory location conflicts with anther operation on the same memory location, also referred to as interference. Instructions are grouped together, and transactional memory requires the tracking or memory data being used. Tracking generally occurs as a cache line granularity. Two separate sets are tracking, including a read set and a write set. The read set includes all cache lines that have been read by a current transaction. The write set includes all cache lines that have been read by the current transaction.

SUMMARY

A system, computer program product, and a method are provided for tracking processor transactional read and write sets.

In one aspect, a system with a processing unit in communication with a memory and a tool is provided to track a processor instruction. More specifically, the tool maintains a non-speculative indication pertaining to a non-speculative instruction stored in a cache unit for a transaction by a first requestor. The non-speculative instruction is a read of data instruction and/or a write of written data instruction. The tool maintains a queue of at least one address corresponding to a speculatively executed instruction corresponding to a speculative member of a read set and/or a write set. The speculatively executed instruction is a load memory read instruction or a store memory write instruction. The tool performs a transaction interference resolution responsive to receiving a request for data by a remote processor. The transaction interference resolution includes the tool utilizing the queue and determining if there is a potential transaction interference that exclusively conflicts with a speculative instruction. The tool places a response to the received request on hold until the speculative instruction is either committed or flushed.

In another aspect, a computer program product is provided for tracking a processor instruction. The computer program product has a computer readable storage device embodied with program code executable by a processing unit. More specifically, program code maintains a non-speculative indication pertaining to a non-speculative instruction stored in a cache unit for a transaction by a first requestor. The non-speculative instruction is a read of data instruction and/or a write of written data instruction. Program code maintains a queue of at least one address corresponding to a speculatively executed instruction corresponding to a speculative member of a read set and/or a write set. The speculatively executed instruction is a load memory read instruction or a store memory write instruction. Program code performs a transaction interference resolution responsive to receiving a request for data by a remote processor. The transaction interference resolution includes the tool utilizing the queue and determining if there is a potential transaction interference that exclusively conflicts with a speculative instruction. Program code places a response to the received request on hold until the speculative instruction is either committed or flushed.

In another aspect, a method is provided to track a processor instruction. A non-speculative indication pertaining to a non-speculative instruction stored in a cache unit for a transaction by a first requestor is maintained. The non-speculative instruction is a read of data instruction and/or a write of written data instruction. A queue of at least one address corresponding to a speculatively executed instruction corresponding to a speculative member of a read set and/or a write set is provided. The speculatively executed instruction is a load memory read instruction or a store memory write instruction. A transaction interference resolution is performed responsive to receiving a request for data by a remote processor. The transaction interference resolution utilizes the queue and determines if there is a potential transaction interference that exclusively conflicts with a speculative instruction. A response to the received request is placed on hold until the speculative instruction is either committed or flushed.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings reference herein forms a part of the specification. Features shown in the drawings are meant as illustrative of only some embodiments, and not of all embodiments unless otherwise explicitly indicated.

DETAILED DESCRIPTION

Figure 1:
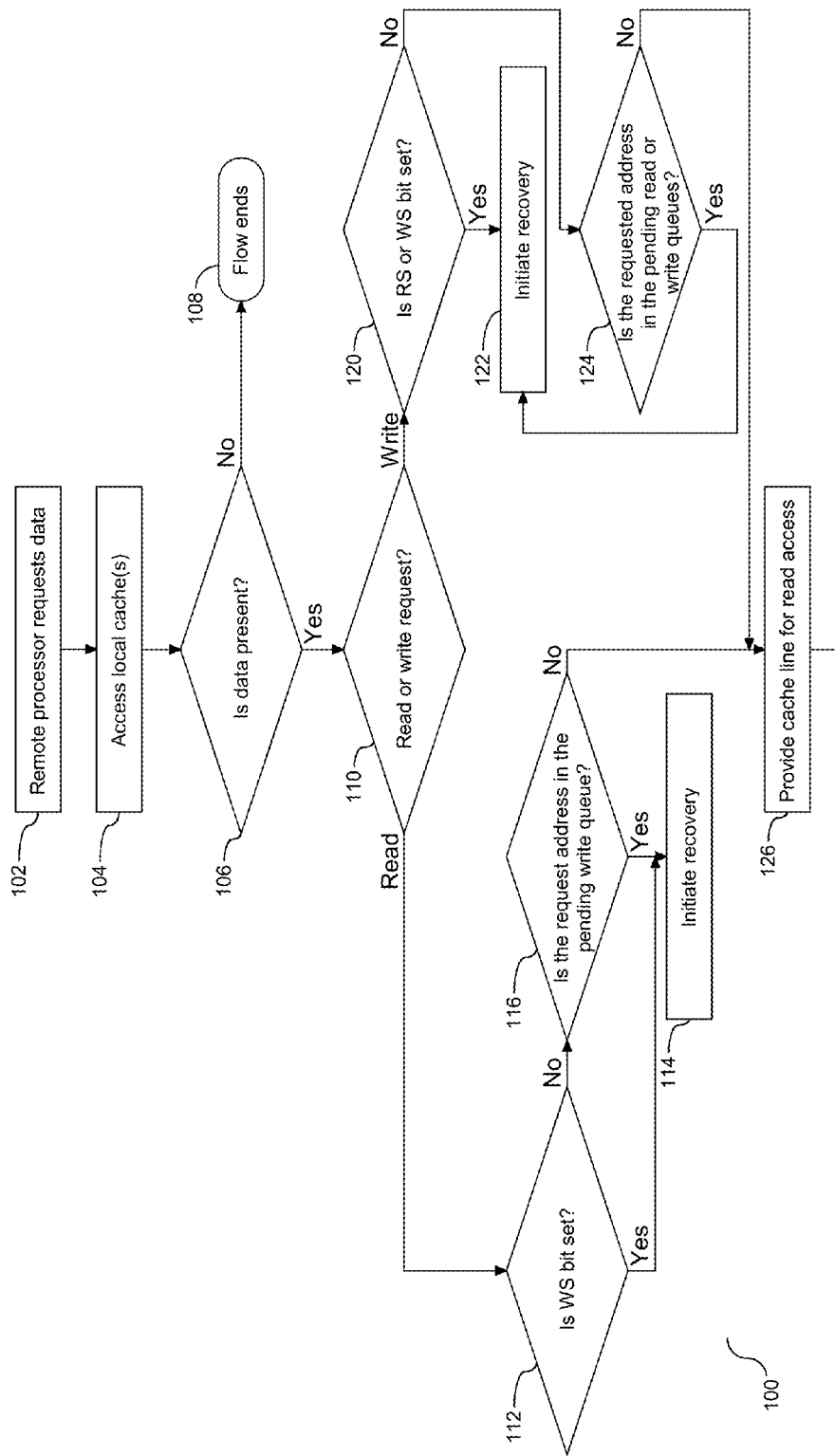
FIG. 1 depicts a flow chart illustrating a process for determining a potential conflict associated with execution of transactions on at least two processors in a transactional memory system.

It will be readily understood that the components of the present embodiment(s), as generally described and illustrated in the Figures herein, may be arranged and designed in a wide variety of different configurations. Thus, the following detailed description of the embodiments of the apparatus, system, and method of the present embodiment(s), as presented in the Figures, is not intended to limit the scope of the embodiment(s), as claimed, but is merely representative of selected embodiments.

Reference throughout this specification to "a select embodiment," "one embodiment," or "an embodiment" means that a particular feature, structure, or characteristic described in connection with the embodiment is included in at least one embodiment described herein. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiment(s) as claimed herein.

Historically, a computer system or processor had only a single processor (also known as a processing unit or central processing unit). The processor included an instruction processing unit (IPU), a branch unit, a memory control unit and the like. Such processors were capable of executing a single thread of a program at a time. Operating systems were developed that could time-share a processor by dispatching a program to be executed on the processor for a period of time, and then dispatching another program to be executed on the processor for another period of time.

As technology evolved, memory subsystem caches were often added to the processor as well as complex dynamic address translation including translation lookaside buffers (TLBs). The IPU itself was often referred to as a processor. As technology continues to evolve, an entire processor could be packaged as a single semiconductor chip or die, such a processor was referred to as a microprocessor. Then processors were developed that incorporated multiple IPUs, such processors were often referred to as multi-processors. Each such processor of a multi-processor computer system (processor) may include individual or shared caches, memory interfaces, system bus, address translation mechanism and the like. Virtual machine and instruction set architecture (ISA) emulators added a layer of software to a processor, that provided the virtual machine with multiple "virtual processors" (aka processors) by time-slice usage of a single IPU in a single hardware processor. As technology further evolved, multi-threaded processors were developed enabling a single hardware processor having a single multi-thread IPU to provide a capability of simultaneously executing threads of different programs, thus each thread of a multi-threaded processor appeared to the operating system as a processor. As technology further evolved, it was possible to put multiple processors (each having an IPU) on a single semiconductor chip or die. These processors were referred to processor cores or just cores. Thus the terms such as processor, central processing unit, processing unit, microprocessor, core, processor core, processor thread, and thread, for example, are often used interchangeably. Aspects of embodiments herein may be practiced by any or all processors including those shown supra, without departing from the teachings herein. Wherein the term "thread" or "processor thread" is used herein, it is expected that particular advantage of the embodiment may be had in a processor thread implementation.

In "Intel® Architecture Instruction Set Extensions Programming Reference" 319433-012A, February 2012, incorporated herein by reference in its entirety, Chapter 8 teaches, in part, that multithreaded applications may take advantage of increasing numbers of CPU cores to achieve higher performance. However, the writing of multi-threaded applications requires programmers to understand and take into account data sharing among the multiple threads. Access to shared data typically requires synchronization mechanisms. These synchronization mechanisms are used to ensure that multiple threads update shared data by serializing operations that are applied to the shared data, often through the use of a critical section that is protected by a lock. Since serialization limits concurrency, programmers try to limit the overhead due to synchronization.

Intel® Transactional Synchronization Extensions (Intel® TSX) allow a processor to dynamically determine whether threads need to be serialized through lock-protected critical sections, and to perform that serialization only when required. This allows the processor to expose and exploit concurrency that is hidden in an application because of dynamically unnecessary synchronization.

With Intel TSX, programmer-specified code regions (also referred to as "transactional regions" or just "transactions") are executed transactionally. If the transactional execution completes successfully, then all memory operations performed within the transactional region will appear to have occurred instantaneously when viewed from other processors. A processor makes the memory operations of the executed transaction, performed within the transactional region, visible to other processors only when a successful commit occurs, i.e., when the transaction successfully completes execution. This process is often referred to as an atomic commit.

Since a successful transactional execution ensures an atomic commit, the processor executes the code region optimistically without explicit synchronization. If synchronization was unnecessary for that specific execution, execution can commit without any cross-thread serialization. If the processor cannot commit atomically, then the optimistic execution fails. When this happens, the processor will roll back the execution, a process referred to as a transactional abort. On a transactional abort, the processor will discard all updates performed in the memory region used by the transaction, restore architectural state to appear as if the optimistic execution never occurred, and resume execution non-transactionally.

A processor can perform a transactional abort for numerous reasons. A primary reason to abort a transaction is due to conflicting memory accesses between the transactionally executing logical processor and another logical processor. Such conflicting memory accesses may prevent a successful transactional execution. Memory addresses read from within a transactional region constitute the read-set of the transactional region and addresses written to within the transactional region constitute the write-set of the transactional region. Intel TSX maintains the read- and write-sets at the granularity of a cache line. A conflicting memory access occurs if another logical processor either reads a location that is part of the transactional region's write-set or writes a location that is a part of either the read- or write-set of the transactional region. A conflicting access typically means that serialization is required for this code region. Since Intel TSX detects data conflicts at the granularity of a cache line, unrelated data locations placed in the same cache line will be detected as conflicts that result in transactional aborts. Transactional aborts may also occur due to limited transactional resources. For example, the amount of data accessed in the region may exceed an implementation-specific capacity. Additionally, some instructions and system events may cause transactional aborts. Frequent transactional aborts result in wasted cycles and increased inefficiency.

Hardware Lock Elision

Hardware Lock Elision (HLE) provides a legacy compatible instruction set interface for programmers to use transactional execution. HLE provides two new instruction prefix hints: XACQUIRE and XRELEASE.

With HLE, a programmer adds the XACQUIRE prefix to the front of the instruction that is used to acquire the lock that is protecting the critical section. The processor treats the prefix as a hint to elide the write associated with the lock acquire operation. Even though the lock acquire has an associated write operation to the lock, the processor does not add the address of the lock to the transactional region's write-set nor does it issue any write requests to the lock. Instead, the address of the lock is added to the read-set. The logical processor enters transactional execution. If the lock was available before the XACQUIRE prefixed instruction, then all other processors will continue to see the lock as available afterwards. Since the transactionally executing logical processor neither added the address of the lock to its write-set nor performed externally visible write operations to the lock, other logical processors can read the lock without causing a data conflict. This allows other logical processors to also enter and concurrently execute the critical section protected by the lock. The processor automatically detects any data conflicts that occur during the transactional execution and will perform a transactional abort if necessary.

Even though the eliding processor did not perform any external write operations to the lock, the hardware ensures program order of operations on the lock. If the eliding processor itself reads the value of the lock in the critical section, it will appear as if the processor had acquired the lock, i.e. the read will return the non-elided value. This behavior allows an HLE execution to be functionally equivalent to an execution without the HLE prefixes.

An XRELEASE prefix can be added in front of an instruction that is used to release the lock protecting a critical section. Releasing the lock involves a write to the lock. If the instruction is to restore the value of the lock to the value the lock had prior to the XACQUIRE prefixed lock acquire operation on the same lock, then the processor elides the external write request associated with the release of the lock and does not add the address of the lock to the write-set. The processor then attempts to commit the transactional execution.

With HLE, if multiple threads execute critical sections protected by the same lock but they do not perform any conflicting operations on each other's data, then the threads can execute concurrently and without serialization. Even though the software uses lock acquisition operations on a common lock, the hardware recognizes this, elides the lock, and executes the critical sections on the two threads without requiring any communication through the lock—if such communication was dynamically unnecessary.

If the processor is unable to execute the region transactionally, then the processor will execute the region non-transactionally and without elision. HLE enabled software has the same forward progress guarantees as the underlying non-HLE lock-based execution. For successful HLE execution, the lock and the critical section code must follow certain guidelines. These guidelines only affect performance; and failure to follow these guidelines will not result in a functional failure. Hardware without HLE support will ignore the XACQUIRE and XRELEASE prefix hints and will not perform any elision since these prefixes correspond to the REPNE/REPE IA-32 prefixes which are ignored on the instructions where XACQUIRE and XRELEASE are valid. Importantly, HLE is compatible with the existing lock-based programming model. Improper use of hints will not cause functional bugs though it may expose latent bugs already in the code.

Restricted Transactional Memory (RTM) provides a flexible software interface for transactional execution. RTM provides three new instructions—XBEGIN, XEND, and XABORT—for programmers to start, commit, and abort a transactional execution.

The programmer uses the XBEGIN instruction to specify the start of a transactional code region and the XEND instruction to specify the end of the transactional code region. If the RTM region could not be successfully executed transactionally, then the XBEGIN instruction takes an operand that provides a relative offset to the fallback instruction address.

A processor may abort RTM transactional execution for many reasons. In many instances, the hardware automatically detects transactional abort conditions and restarts execution from the fallback instruction address with the architectural state corresponding to that present at the start of the XBEGIN instruction and the EAX register updated to describe the abort status.

The XABORT instruction allows programmers to abort the execution of an RTM region explicitly. The XABORT instruction takes an 8-bit immediate argument that is loaded into the EAX register and will thus be available to software following an RTM abort. RTM instructions do not have any data memory location associated with them. While the hardware provides no guarantees as to whether an RTM region will ever successfully commit transactionally, most transactions that follow the recommended guidelines are expected to successfully commit transactionally. However, programmers must always provide an alternative code sequence in the fallback path to guarantee forward progress. This may be as simple as acquiring a lock and executing the specified code region non-transactionally. Further, a transaction that always aborts on a given implementation may complete transactionally on a future implementation. Therefore, programmers must ensure the code paths for the transactional region and the alternative code sequence are functionally tested.

Detection of HLE Support

A processor supports HLE execution if CPUID.07H.EBX.HLE [bit 4]=1. However, an application can use the HLE prefixes (XACQUIRE and XRELEASE) without checking whether the processor supports HLE. Processors without HLE support ignore these prefixes and will execute the code without entering transactional execution.

Detection of RTM Support

A processor supports RTM execution if CPUID.07H.EBX.RTM [bit 11]=1. An application must check if the processor supports RTM before it uses the RTM instructions (XBEGIN, XEND, XABORT). These instructions will generate a #UD exception when used on a processor that does not support RTM.

Detection of XTEST Instruction

A processor supports the XTEST instruction if it supports either HLE or RTM. An application must check either of these feature flags before using the XTEST instruction. This instruction will generate a #UD exception when used on a processor that does not support either HLE or RTM.

Querying Transactional Execution Status

The XTEST instruction can be used to determine the transactional status of a transactional region specified by HLE or RTM. Note, while the HLE prefixes are ignored on processors that do not support HLE, the XTEST instruction will generate a #UD exception when used on processors that do not support either HLE or RTM.

Requirements for HLE Locks

For HLE execution to successfully commit transactionally, the lock must satisfy certain properties and access to the lock must follow certain guidelines.

An XRELEASE prefixed instruction must restore the value of the elided lock to the value it had before the lock acquisition. This allows hardware to safely elide locks by not adding them to the write-set. The data size and data address of the lock release (XRELEASE prefixed) instruction must match that of the lock acquire (XACQUIRE prefixed) and the lock must not cross a cache line boundary.

Software should not write to the elided lock inside a transactional HLE region with any instruction other than an XRELEASE prefixed instruction, otherwise such a write may cause a transactional abort. In addition, recursive locks (where a thread acquires the same lock multiple times without first releasing the lock) may also cause a transactional abort. Note that software can observe the result of the elided lock acquire inside the critical section. Such a read operation will return the value of the write to the lock.

The processor automatically detects violations to these guidelines, and safely transitions to a non-transactional execution without elision. Since Intel TSX detects conflicts at the granularity of a cache line, writes to data collocated on the same cache line as the elided lock may be detected as data conflicts by other logical processors eliding the same lock.

Transactional Nesting

Both HLE and RTM support nested transactional regions. However, a transactional abort restores state to the operation that started transactional execution: either the outermost XACQUIRE prefixed HLE eligible instruction or the outermost XBEGIN instruction. The processor treats all nested transactions as one transaction.

HLE Nesting and Elision

Programmers can nest HLE regions up to an implementation specific depth of MAX_HLE_NEST_COUNT. Each logical processor tracks the nesting count internally but this count is not available to software. An XACQUIRE prefixed HLE-eligible instruction increments the nesting count, and an XRELEASE prefixed HLE-eligible instruction decrements it. The logical processor enters transactional execution when the nesting count goes from zero to one. The logical processor attempts to commit only when the nesting count becomes zero. A transactional abort may occur if the nesting count exceeds MAX_HLE_NEST_COUNT.

In addition to supporting nested HLE regions, the processor can also elide multiple nested locks. The processor tracks a lock for elision beginning with the XACQUIRE prefixed HLE eligible instruction for that lock and ending with the XRELEASE prefixed HLE eligible instruction for that same lock. The processor can, at any one time, track up to a MAX_HLE_ELIDED_LOCKS number of locks. For example, if the implementation supports a MAX_HLE_E-LIDED_LOCKS value of two and if the programmer nests three HLE identified critical sections (by performing XACQUIRE prefixed HLE eligible instructions on three distinct locks without performing an intervening XRELEASE prefixed HLE eligible instruction on any one of the locks), then the first two locks will be elided, but the third won't be elided (but will be added to the transaction's write set). However, the execution will still continue transactionally. Once an XRELEASE for one of the two elided locks is encountered, a subsequent lock acquired through the XACQUIRE prefixed HLE eligible instruction will be elided.

The processor attempts to commit the HLE execution when all elided XACQUIRE and XRELEASE pairs have been matched, the nesting count goes to zero, and the locks have satisfied requirements. If execution cannot commit atomically, then execution transitions to a non-transactional execution without elision as if the first instruction did not have an XACQUIRE prefix.

RTM Nesting

Programmers can nest RTM regions up to an implementation specific MAX_RTM_NEST_COUNT. The logical processor tracks the nesting count internally but this count is not available to software. An XBEGIN instruction increments the nesting count, and an XEND instruction decrements the nesting count. The logical processor attempts to commit only if the nesting count becomes zero. A transactional abort occurs if the nesting count exceeds MAX_RTM_NEST_COUNT.

Nesting HLE and RTM

HLE and RTM provide two alternative software interfaces to a common transactional execution capability. Transactional processing behavior is implementation specific when HLE and RTM are nested together, e.g., HLE is inside RTM or RTM is inside HLE. However, in all cases, the implementation will maintain HLE and RTM semantics. An implementation may choose to ignore HLE hints when used inside RTM regions, and may cause a transactional abort when RTM instructions are used inside HLE regions. In the latter case, the transition from transactional to non-transactional execution occurs seamlessly since the processor will re-execute the HLE region without actually doing elision, and then execute the RTM instructions.

Abort Status Definition

RTM uses the EAX register to communicate abort status to software. Following an RTM abort the EAX register has the following definition.

TABLE 1

RTM Abort Status Definition

| EAX Register Bit Position | Meaning |
| --- | --- |
| 0 | Set if abort caused by XABORT instruction |
| 1 | If set, the transaction may succeed on retry, this bit is always clear if bit 0 is set |
| 2 | Set if another logical processor conflicted with a memory address that was part of the transaction that aborted |
| 3 | Set if an internal buffer overflowed |
| 4 | Set if a debug breakpoint was hit |
| 5 | Set if an abort occurred during execution of a nested transaction |
| 23:6 | Reserved |
| 31-24 | XABORT argument (only valid if bit 0 set, otherwise reserved) |

The EAX abort status for RTM only provides causes for aborts. It does not by itself encode whether an abort or commit occurred for the RTM region. The value of EAX can be 0 following an RTM abort. For example, a CPUID instruction when used inside an RTM region causes a transactional abort and may not satisfy the requirements for setting any of the EAX bits. This may result in an EAX value of 0.

RTM Memory Ordering

A successful RTM commit causes all memory operations in the RTM region to appear to execute atomically. A successfully committed RTM region consisting of an XBEGIN followed by an XEND, even with no memory operations in the RTM region, has the same ordering semantics as a LOCK prefixed instruction.

The XBEGIN instruction does not have fencing semantics. However, if an RTM execution aborts, then all memory updates from within the RTM region are discarded and are not made visible to any other logical processor.

RTM-Enabled Debugger Support

By default, any debug exception inside an RTM region will cause a transactional abort and will redirect control flow to the fallback instruction address with architectural state recovered and 4 in EAX set. However, to allow software debuggers to intercept execution on debug exceptions, the RTM architecture provides additional capability.

If 11 of DR7 and bit 15 of the IA32_DEBUGCTL_MSR are both 1, any RTM abort due to a debug exception (#DB) or breakpoint exception (#BP) causes execution to roll back and restart from the XBEGIN instruction instead of the fallback address. In this scenario, the EAX register will also be restored back to the point of the XBEGIN instruction.

Programming Considerations

Typical programmer-identified regions are expected to transactionally execute and commit successfully. However, Intel TSX does not provide any such guarantee. A transactional execution may abort for many reasons. To take full advantage of the transactional capabilities, programmers should follow certain guidelines to increase the probability of their transactional execution committing successfully.

This section discusses various events that may cause transactional aborts. The architecture ensures that updates performed within a transaction that subsequently aborts execution will never become visible. Only committed transactional executions initiate an update to the architectural state. Transactional aborts never cause functional failures and only affect performance.

Instruction Based Considerations

Programmers can use any instruction safely inside a transaction (HLE or RTM) and can use transactions at any privilege level. However, some instructions will always abort the transactional execution and cause execution to seamlessly and safely transition to a non-transactional path.

Intel TSX allows for most common instructions to be used inside transactions without causing aborts. The following operations inside a transaction do not typically cause an abort:

Operations on the instruction pointer register, general purpose registers (GPRs) and the status flags (CF, OF, SF, PF, AF, and ZF); and Operations on XMM and YMM registers and the MXCSR register.

However, programmers must be careful when inter-mixing SSE and AVX operations inside a transactional region. Intermixing SSE instructions accessing XMM registers and AVX instructions accessing YMM registers may cause transactions to abort. Programmers may use REP/REPNE prefixed string operations inside transactions. However, long strings may cause aborts. Further, the use of CLD and STD instructions may cause aborts if they change the value of the DF flag. However, if DF is 1, the STD instruction will not cause an abort. Similarly, if DF is 0, then the CLD instruction will not cause an abort.

Instructions not enumerated here as causing abort when used inside a transaction will typically not cause a transaction to abort (examples include but are not limited to MFENCE, LFENCE, SFENCE, RDTSC, RDTSCP, etc.).

The following instructions will abort transactional execution on any implementation:

XABORT
CPUID
PAUSE

In addition, in some implementations, the following instructions may always cause transactional aborts. These instructions are not expected to be commonly used inside typical transactional regions. However, programmers must not rely on these instructions to force a transactional abort, since whether they cause transactional aborts is implementation dependent.

Operations on X87 and MMX architecture state. This includes all MMX and X87 instructions, including the FXRSTOR and FXSAVE instructions.

Update to non-status portion of EFLAGS: CLI, STI, POPFD, POPFQ, CLTS.

Instructions that update segment registers, debug registers and/or control registers:

MOV to DS/ES/FS/GS/SS, POP DS/ES/FS/GS/SS, LDS, LES, LFS, LGS, LSS, SWAPGS, WRFSBASE, WRGSBASE, LGDT, SGDT, LIDT, SIDT, LLDT, SLDT, LTR, STR, Far CALL, Far JMP, Far RET, IRET, MOV to DRx, MOV to CR0/CR2/CR3/CR4/CR8 and LMSW.

Ring transitions: SYSENTER, SYSCALL, SYSEXIT, and SYSRET.

TLB and Cacheability control: CLFLUSH, INVD, WBINVD, INVLPG, INVPCID, and memory instructions with a non-temporal hint (MOVNTDQA, MOVNTDQ, MOVNTI, MOVNTPD, MOVNTPS, and MOVNTQ).

Processor state save: XSAVE, XSAVEOPT, and XRSTOR.

Interrupts: INTn, INTO.

IO: IN, INS, REP INS, OUT, OUTS, REP OUTS and their variants.

VMX: VMPTRLD, VMPTRST, VMCLEAR, VMREAD, VMWRITE, VMCALL, VMLAUNCH, VMRESUME, VMXOFF, VMXON, INVEPT, and INVVPID.

SMX: GETSEC.

UD2, RSM, RDMSR, WRMSR, HLT, MONITOR, MWAIT, XSETBV, VZEROUPPER, MASKMOVQ, and V/MASKMOVDQU.

Runtime Considerations

In addition to the instruction-based considerations, runtime events may cause transactional execution to abort. These may be due to data access patterns or micro-architectural implementation features. The following list is not a comprehensive discussion of all abort causes.

Any fault or trap in a transaction that must be exposed to software will be suppressed. Transactional execution will abort and execution will transition to a non-transactional execution, as if the fault or trap had never occurred. If an exception is not masked, then that un-masked exception will result in a transactional abort and the state will appear as if the exception had never occurred.

Synchronous exception events (#DE, #OF, #NP, #SS, #GP, #BR, #UD, #AC, #XF, #PF, #NM, #TS, #MF, #DB, #BP/INT3) that occur during transactional execution may cause an execution not to commit transactionally, and require a non-transactional execution. These events are suppressed as if they had never occurred. With HLE, since the non-transactional code path is identical to the transactional code path, these events will typically re-appear when the instruction that caused the exception is re-executed non-transactionally, causing the associated synchronous events to be delivered appropriately in the non-transactional execution. Asynchronous events (NMI, SMI, INTR, IPI, PMI, etc.) occurring during transactional execution may cause the transactional execution to abort and transition to a non-transactional execution. The asynchronous events will be pended and handled after the transactional abort is processed.

Transactions only support write-back cacheable memory type operations. A transaction may always abort if the transaction includes operations on any other memory type. This includes instruction fetches to UC memory type.

Memory accesses within a transactional region may require the processor to set the Accessed and Dirty flags of the referenced page table entry. The behavior of how the processor handles this is implementation specific. Some implementations may allow the updates to these flags to become externally visible even if the transactional region subsequently aborts. Some Intel TSX implementations may choose to abort the transactional execution if these flags need to be updated. Further, a processor's page-table walk may generate accesses to its own transactionally written but uncommitted state. Some Intel TSX implementations may choose to abort the execution of a transactional region in such situations. Regardless, the architecture ensures that, if the transactional region aborts, then the transactionally written state will not be made architecturally visible through the behavior of structures such as TLBs.

Executing self-modifying code transactionally may also cause transactional aborts. Programmers must continue to follow the Intel recommended guidelines for writing self-modifying and cross-modifying code even when employing HLE and RTM. While an implementation of RTM and HLE will typically provide sufficient resources for executing common transactional regions, implementation constraints and excessive sizes for transactional regions may cause a transactional execution to abort and transition to a non-transactional execution. The architecture provides no guarantee of the amount of resources available to do transactional execution and does not guarantee that a transactional execution will ever succeed.

Conflicting requests to a cache line accessed within a transactional region may prevent the transaction from executing successfully. For example, if logical processor P0 reads line A in a transactional region and another logical processor P1 writes line A (either inside or outside a transactional region) then logical processor P0 may abort if logical processor P1's write interferes with processor P0's ability to execute transactionally.

Similarly, if P0 writes line A in a transactional region and P1 reads or writes line A (either inside or outside a transactional region), then P0 may abort if P1's access to line A interferes with P0's ability to execute transactionally. In addition, other coherence traffic may at times appear as conflicting requests and may cause aborts. While these false conflicts may happen, they are expected to be uncommon. The conflict resolution policy to determine whether P0 or P1 aborts in the above scenarios is implementation specific.

Generic Transaction Execution Embodiments:

According to "ARCHITECTURES FOR TRANSACTIONAL MEMORY", a dissertation submitted to the Department of Computer Science and the Committee on Graduate Studies of Stanford University in partial fulfillment of the requirements for the Degree of Doctor of Philosophy, by Austen McDonald, June 2009, incorporated by reference herein in its entirety, fundamentally, there are three mechanisms needed to implement an atomic and isolated transactional region: versioning, conflict detection, and contention management.

To make a transactional code region appear atomic, all the modifications performed by that transactional code region must be stored and kept isolated from other transactions until commit time. The system does this by implementing a versioning policy. Two versioning paradigms exist: eager and lazy. An eager versioning system stores newly generated transactional values in place and stores previous memory values on the side, in what is called an undo-log. A lazy versioning system stores new values temporarily in what is called a write buffer, copying them to memory only on commit. In either system, the cache is used to optimize storage of new versions.

To ensure that transactions appear to be performed atomically, conflicts must be detected and resolved. The two systems, i.e., the eager and lazy versioning systems, detect conflicts by implementing a conflict detection policy, either optimistic or pessimistic. An optimistic system executes transactions in parallel, checking for conflicts only when a transaction commits. A pessimistic system checks for conflicts at each load and store. Similar to versioning, conflict detection also uses the cache, marking each line as either part of the read-set, part of the write-set, or both. The two systems resolve conflicts by implementing a contention management policy. Many contention management policies exist, some are more appropriate for optimistic conflict detection and some are more appropriate for pessimistic. Described below are some example policies.

Since each transactional memory (TM) system needs both versioning detection and conflict detection, these options give rise to four distinct TM designs: Eager-Pessimistic (EP), Eager-Optimistic (EO), Lazy-Pessimistic (LP), and Lazy-Optimistic (LO). Table 2 briefly describes all four distinct TM designs.

Figure 11:
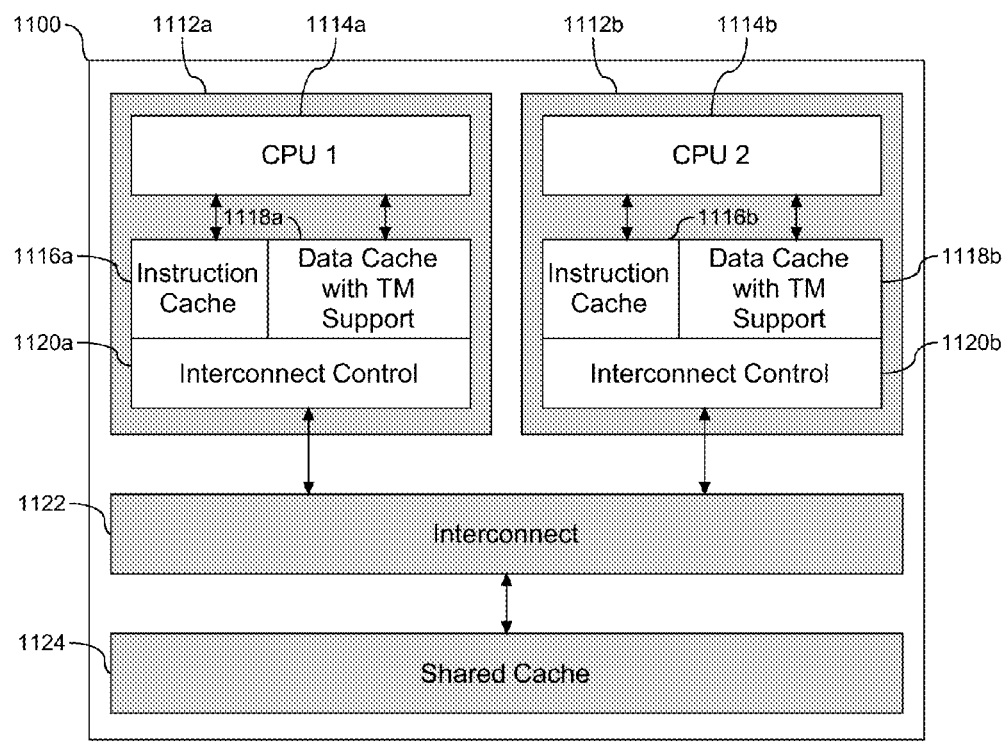
FIG. 11 depicts a block diagram showing an example multicore transactional memory environment, in accordance with an illustrative embodiment.
Figure 12:
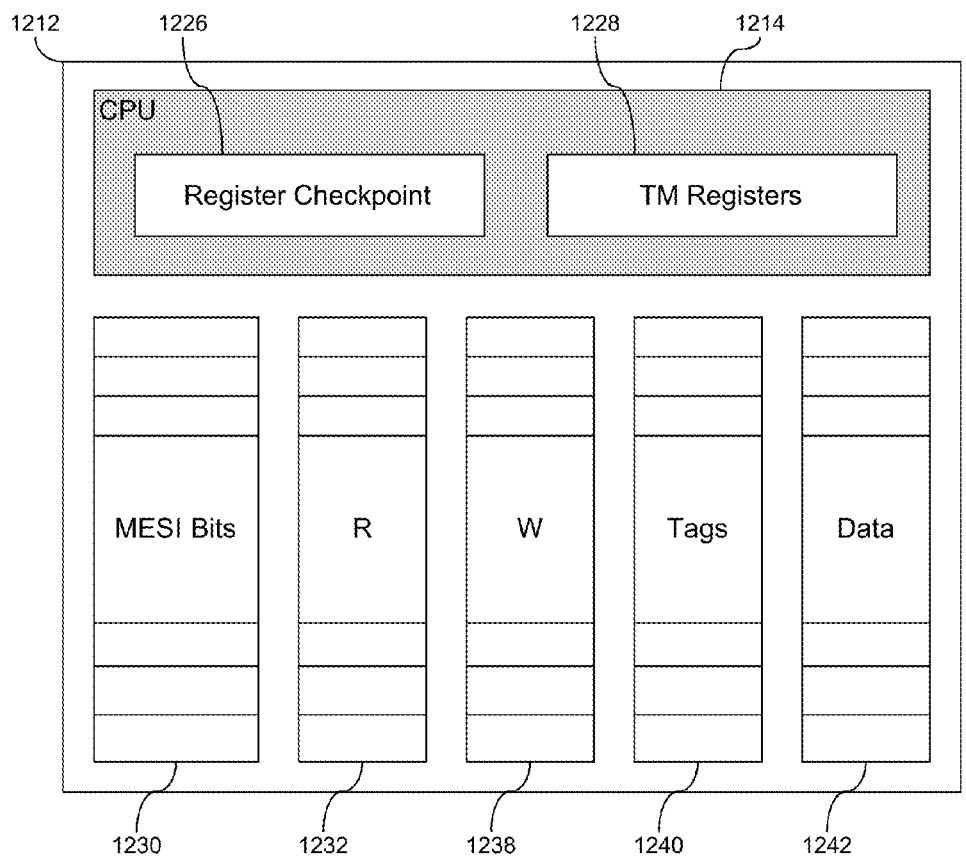
FIG. 12 depicts a block diagram showing an example multicore transactional memory environment, in accordance with an illustrative embodiment.

FIGS. 11 and 12 depict an example of a multicore TM environment. 11 shows many TM-enabled CPUs (CPU$_1$ (1114a), CPU$_2$ (1114b), etc.) on one die (1100), connected with an interconnect (1122), under management of an interconnect control (1120a), (1120b). Each CPU (1114a), (1114b) (also known as a Processor) may have a split cache consisting of an Instruction Cache (1116a), (1116b) for caching instructions from memory to be executed and a Data Cache (1118a), (1118b) with TM support for caching data (operands) of memory locations to be operated on by CPU (1114a), (1114b) (in FIG. 11, each CPU (1114a), (1114b) and its associated caches are referenced as (1112a), (1112b)). In an implementation, caches of multiple dies (1100) are interconnected to support cache coherency between the caches of the multiple dies (1100). In an implementation, a single cache, rather than the split cache is employed holding both instructions and data. In implementations, the CPU caches are one level of caching in a hierarchical cache structure. For example each die (1100) may employ a shared cache (1124) to be shared amongst all the CPUs on the die (1100). In another implementation, each die may have access to a shared cache (1124), shared amongst all the processors of all the dies (1100).

FIG. 12 shows the details of an example transactional CPU environment (1212), having a CPU (1214), including additions to support TM. The transactional CPU (processor) (1214) may include hardware for supporting Register Checkpoints (1226) and special TM Registers (1228). The transactional CPU cache may have the MESI bits (1230), Tags (1240) and Data (1242) of a conventional cache but also, for example, R bits (1232) showing a line has been read by the CPU (1214) while executing a transaction and W bits (1238) showing a line has been written-to by the CPU (1214) while executing a transaction.

A key detail for programmers in any TM system is how non-transactional accesses interact with transactions. By design, transactional accesses are screened from each other using the mechanisms above. However, the interaction between a regular, non-transactional load with a transaction containing a new value for that address must still be considered. In addition, the interaction between a non-transactional store with a transaction that has read that address must also be explored. These are issues of the database concept isolation.

A TM system is said to implement strong isolation, sometimes called strong atomicity, when every non-transactional load and store acts like an atomic transaction. Therefore, non-transactional loads cannot see uncommitted data and non-transactional stores cause atomicity violations in any transactions that have read that address. A system where this is not the case is said to implement weak isolation, sometimes called weak atomicity.

Strong isolation is often more desirable than weak isolation due to the relative ease of conceptualization and implementation of strong isolation. Additionally, if a programmer has forgotten to surround some shared memory references with transactions, causing bugs, then with strong isolation, the programmer will often detect that oversight using a simple debug interface because the programmer will see a non-transactional region causing atomicity violations. Also, programs written in one model may work differently on another model.

Further, strong isolation is often easier to support in hardware TM than weak isolation. With strong isolation, since the coherence protocol already manages load and store communication between processors, transactions can detect non-transactional loads and stores and act appropriately. To implement strong isolation in software Transactional Memory (TM), non-transactional code must be modified to include read- and write-barriers; potentially crippling performance. Although great effort has been expended to remove many un-needed barriers, such techniques are often complex and performance is typically far lower than that of HTMs.

TABLE 2

Transactional Memory Design Space

| | | VERSIONING | |
| --- | --- | --- | --- |
| | | Lazy | Eager |
| CONFLICT DETECTION | Optimistic | Storing updates in a write buffer; detecting conflicts at commit time. | Not practical: waiting to update memory until commit time but detecting conflicts at access time guarantees wasted work and provides no advantage |
| | Pessimistic | Storing updates in a write buffer; detecting conflicts at access time. | Updating memory, keeping old values in undo log; detecting conflicts at access time. |

Table 2 illustrates the fundamental design space of transactional memory (versioning and conflict detection).

Eager-Pessimistic (EP) This first TM design described below is known as Eager-Pessimistic. An EP system stores its write-set "in place" (hence the name "eager") and, to support rollback, stores the old values of overwritten lines in an "undo log". Processors use the W (1238) and R (1232) cache bits to track read and write-sets and detect conflicts when receiving snooped load requests. Perhaps the most notable examples of EP systems in known literature are Log TM and UTM.

Beginning a transaction in an EP system is much like beginning a transaction in other systems: tm_begin( ) takes a register checkpoint, and initializes any status registers. An EP system also requires initializing the undo log, the details of which are dependent on the log format, but often involve initializing a log base pointer to a region of pre-allocated, thread-private memory, and clearing a log bounds register.

Versioning: In EP, due to the way eager versioning is designed to function, the MESI (1230) state transitions (cache line indicators corresponding to Modified, Exclusive, Shared, and Invalid code states) are left mostly unchanged. Outside of a transaction, the MESI (1230) state transitions are left completely unchanged. When reading a line inside a transaction, the standard coherence transitions apply (S (Shared)→S, I (Invalid)→S, or I→E (Exclusive)), issuing a load miss as needed, but the R (1232) bit is also set. Likewise, writing a line applies the standard transitions (S→M, E→I, I→M), issuing a miss as needed, but also sets the W (1038) (Written) bit. The first time a line is written, the old version of the entire line is loaded then written to the undo log to preserve it in case the current transaction aborts. The newly written data is then stored "in-place," over the old data.

Conflict Detection: Pessimistic conflict detection uses coherence messages exchanged on misses, or upgrades, to look for conflicts between transactions. When a read miss occurs within a transaction, other processors receive a load request; but they ignore the request if they do not have the needed line. If the other processors have the needed line non-speculatively or have the line R (1232) (Read), they downgrade that line to S, and in certain cases issue a cache-to-cache transfer if they have the line in MESI's (1230) M or E state. However, if the cache has the line W (1238), then a conflict is detected between the two transactions and additional action(s) must be taken.

Similarly, when a transaction seeks to upgrade a line from shared to modified (on a first write), the transaction issues an exclusive load request, which is also used to detect conflicts. If a receiving cache has the line non-speculatively, then the line is invalidated, and in certain cases a cache-to-cache transfer (M or E states) is issued. But, if the line is R (1232) or W (1038), a conflict is detected.

Validation: Because conflict detection is performed on every load, a transaction always has exclusive access to its own write-set. Therefore, validation does not require any additional work.

Commit: Since eager versioning stores the new version of data items in place, the commit process simply clears the W (1238) and R (1232) bits and discards the undo log.

Abort: When a transaction rolls back, the original version of each cache line in the undo log must be restored, a process called "unrolling" or "applying" the log. This is done during tm_discard ( ) and must be atomic with regard to other transactions. Specifically, the write-set must still be used to detect conflicts: this transaction has the only correct version of lines in its undo log, and requesting transactions must wait for the correct version to be restored from that log. Such a log can be applied using a hardware state machine or software abort handler.

Eager-Pessimistic has the characteristics of: Commit is simple and since it is in-place, very fast. Similarly, validation is a no-op. Pessimistic conflict detection detects conflicts early, thereby reducing the number of "doomed" transactions. For example, if two transactions are involved in a Write-After-Read dependency, then that dependency is detected immediately in pessimistic conflict detection. However, in optimistic conflict detection such conflicts are not detected until the writer commits.

Eager-Pessimistic also has the characteristics of: As described above, the first time a cache line is written, the old value must be written to the log, incurring extra cache accesses. Aborts are expensive as they require undoing the log. For each cache line in the log, a load must be issued, perhaps going as far as main memory before continuing to the next line. Pessimistic conflict detection also prevents certain serializable schedules from existing.

Additionally, because conflicts are handled as they occur, there is a potential for livelock and careful contention management mechanisms must be employed to guarantee forward progress.

Lazy-Optimistic (LO)

Another popular TM design is Lazy-Optimistic (LO), which stores its write-set in a "write buffer" or "redo log" and detects conflicts at commit time (still using the R (1032) and W (1038) bits).

Versioning: Just as in the EP system, the MESI protocol of the LO design is enforced outside of the transactions. Once inside a transaction, reading a line incurs the standard MESI transitions but also sets the R (1232) bit. Likewise, writing a line sets the W (1238) bit of the line, but handling the MESI transitions of the LO design is different from that of the EP design. First, with lazy versioning, the new versions of written data are stored in the cache hierarchy until commit while other transactions have access to old versions available in memory or other caches. To make available the old versions, dirty lines (M lines) must be evicted when first written by a transaction. Second, no upgrade misses are needed because of the optimistic conflict detection feature: if a transaction has a line in the S state, it can simply write to it and upgrade that line to an M state without communicating the changes with other transactions because conflict detection is done at commit time.

Conflict Detection and Validation: To validate a transaction and detect conflicts, LO communicates the addresses of speculatively modified lines to other transactions only when it is preparing to commit. On validation, the processor sends one, potentially large, network packet containing all the addresses in the write-set. Data is not sent, but left in the cache of the committer and marked dirty (M). To build this packet without searching the cache for lines marked W, a simple bit vector is used, called a "store buffer," with one bit per cache line to track these speculatively modified lines. Other transactions use this address packet to detect conflicts: if an address is found in the cache and the R (1232) and/or W (1238) bits are set, then a conflict is initiated. If the line is found but neither R (1232) nor W (1238) is set, then the line is simply invalidated, which is similar to processing an exclusive load.

To support transaction atomicity, these address packets must be handled atomically, i.e., no two address packets may exist at once with the same addresses. In an LO system, this can be achieved by simply acquiring a global commit token before sending the address packet. However, a two-phase commit scheme could be employed by first sending out the address packet, collecting responses, enforcing an ordering protocol (perhaps oldest transaction first), and committing once all responses are satisfactory.

Commit: Once validation has occurred, commit needs no special treatment: simply clear W (1238) and R (1232) bits and the store buffer. The transaction's writes are already marked dirty in the cache and other caches' copies of these lines have been invalidated via the address packet. Other processors can then access the committed data through the regular coherence protocol.

Abort: Rollback is equally easy: because the write-set is contained within the local caches, these lines can be invalidated, then clear W (1238) and R (1232) bits and the store buffer. The store buffer allows W lines to be found to invalidate without the need to search the cache.

Lazy-Optimistic has the characteristics of: Aborts are very fast, requiring no additional loads or stores and making only local changes. More serializable schedules can exist than found in EP, which allows an LO system to more aggressively speculate that transactions are independent, which can yield higher performance. Finally, the late detection of conflicts can increase the likelihood of forward progress.

Lazy-Optimistic also has the characteristics of: Validation takes global communication time proportional to size of write set. Doomed transactions can waste work since conflicts are detected only at commit time.

Lazy-Pessimistic (LP)

Lazy-Pessimistic (LP) represents a third TM design option, sitting somewhere between EP and LO: storing newly written lines in a write buffer but detecting conflicts on a per access basis.

Versioning: Versioning is similar but not identical to that of LO: reading a line sets its R bit (1032), writing a line sets its W bit (1238), and a store buffer is used to track W lines in the cache. Also, dirty (M) lines must be evicted when first written by a transaction, just as in LO. However, since conflict detection is pessimistic, load exclusives must be performed when upgrading a transactional line from I, S→M, which is unlike LO.

Conflict Detection: LP's conflict detection operates the same as EP's: using coherence messages to look for conflicts between transactions.

Validation: Like in EP, pessimistic conflict detection ensures that at any point, a running transaction has no conflicts with any other running transaction, so validation is a no-op.

Commit: Commit needs no special treatment: simply clear W (1238) and R (1232) bits and the store buffer, like in LO.

Abort: Rollback is also like that of LO: simply invalidate the write-set using the store buffer and clear the W and R bits and the store buffer.

Eager-Optimistic (EO)

The LP has the characteristics of: Like LO, aborts are very fast. Like EP, the use of pessimistic conflict detection reduces the number of "doomed" transactions. Like EP, some serializable schedules are not allowed and conflict detection must be performed on each cache miss.

The final combination of versioning and conflict detection is Eager-Optimistic (EO). EO may be a less than optimal choice for HTM systems: since new transactional versions are written in-place, other transactions have no choice but to notice conflicts as they occur (i.e., as cache misses occur). But since EO waits until commit time to detect conflicts, those transactions become "zombies," continuing to execute, wasting resources, yet are "doomed" to abort.

EO has proven to be useful in STMs and is implemented by Bartok-STM and McRT. A lazy versioning STM needs to check its write buffer on each read to ensure that it is reading the most recent value. Since the write buffer is not a hardware structure, this is expensive, hence the preference for write-in-place eager versioning. Additionally, since checking for conflicts is also expensive in an STM, optimistic conflict detection offers the advantage of performing this operation in bulk.

Contention Management

How a transaction rolls back once the system has decided to abort that transaction has been described above, but, since a conflict involves two transactions, the topics of which transaction should abort, how that abort should be initiated, and when should the aborted transaction be retried need to be explored. These are topics that are addressed by Contention Management (CM), a key component of transactional memory. Described below are policies regarding how the systems initiate aborts and the various established methods of managing which transactions should abort in a conflict.

Contention Management Policies

A Contention Management (CM) Policy is a mechanism that determines which transaction involved in a conflict should abort and when the aborted transaction should be retried. For example, it is often the case that retrying an aborted transaction immediately does not lead to the best performance. Conversely, employing a back-off mechanism, which delays the retrying of an aborted transaction, can yield better performance. STMs first grappled with finding the best contention management policies and many of the policies outlined below were originally developed for STMs.

CM Policies draw on a number of measures to make decisions, including ages of the transactions, size of read- and write-sets, the number of previous aborts, etc. The combinations of measures to make such decisions are endless, but certain combinations are described below, roughly in order of increasing complexity.

To establish some nomenclature, first note that in a conflict there are two sides: the attacker and the defender. The attacker is the transaction requesting access to a shared memory location. In pessimistic conflict detection, the attacker is the transaction issuing the load or load exclusive. In optimistic, the attacker is the transaction attempting to validate. The defender in both cases is the transaction receiving the attacker's request.

An Aggressive CM Policy immediately and always retries either the attacker or the defender. In LO, Aggressive means that the attacker always wins, and so Aggressive is sometimes called committer wins. Such a policy was used for the earliest LO systems. In the case of EP, Aggressive can be either defender wins or attacker wins.

Restarting a conflicting transaction that will immediately experience another conflict is bound to waste work—namely interconnect bandwidth refilling cache misses. A Polite CM Policy employs exponential backoff (but linear could also be used) before restarting conflicts. To prevent starvation, a situation where a process does not have resources allocated to it by the scheduler, the exponential backoff greatly increases the odds of transaction success after some n retries.

Another approach to conflict resolution is to randomly abort the attacker or defender (a policy called Randomized). Such a policy may be combined with a randomized backoff scheme to avoid unneeded contention.

However, making random choices, when selecting a transaction to abort, can result in aborting transactions that have completed "a lot of work", which can waste resources. To avoid such waste, the amount of work completed on the transaction can be taken into account when determining which transaction to abort. One measure of work could be a transaction's age. Other methods include Oldest, Bulk TM, Size Matters, Karma, and Polka. Oldest is a simple timestamp method that aborts the younger transaction in a conflict. Bulk TM uses this scheme. Size Matters is like Oldest but instead of transaction age, the number of read/written words is used as the priority, reverting to Oldest after a fixed number of aborts. Karma is similar, using the size of the write-set as priority. Rollback then proceeds after backing off a fixed amount of time. Aborted transactions keep their priorities after being aborted (hence the name Karma). Polka works like Karma but instead of backing off a predefined amount of time, it backs off exponentially more each time.

Since aborting wastes work, it is logical to argue that stalling an attacker until the defender has finished their transaction would lead to better performance. Unfortunately, such a simple scheme easily leads to deadlock.

Deadlock avoidance techniques can be used to solve this problem. Greedy uses two rules to avoid deadlock. The first rule is, if a first transaction, T1, has lower priority than a second transaction, T0, or if T1 is waiting for another transaction, then T1 aborts when conflicting with T0. The second rule is, if T1 has higher priority than T0 and is not waiting, then T0 waits until T1 commits, aborts, or starts waiting (in which case the first rule is applied). Greedy provides some guarantees about time bounds for executing a set of transactions. One EP design (Log TM) uses a CM policy similar to Greedy to achieve stalling with conservative deadlock avoidance.

Example MESI coherency rules provide for four possible states in which a cache line of a multiprocessor cache system may reside, M, E, S, and I, defined as follows:

Modified (M): The cache line is present only in the current cache, and is dirty; it has been modified from the value in main memory. The cache is required to write the data back to main memory at some time in the future, before permitting any other read of the (no longer valid) main memory state. The write-back changes the line to the Exclusive state.

Exclusive (E): The cache line is present only in the current cache, but is clean; it matches main memory. It may be changed to the Shared state at any time, in response to a read request. Alternatively, it may be changed to the Modified state when writing to it.

Shared (S): Indicates that this cache line may be stored in other caches of the machine and is "clean"; it matches the main memory. The line may be discarded (changed to the Invalid state) at any time.

Invalid (I): Indicates that this cache line is invalid (unused).

TM coherency status indicators (R (1232), W (1238)) may be provided for each cache line, in addition to, or encoded in the MESI coherency bits. An R (1232) indicator indicates the current transaction has read from the data of the cache line, and a W (1238) indicator indicates the current transaction has written to the data of the cache line.

In another aspect of TM design, a system is designed using transactional store buffers. U.S. Pat. No. 6,349,361 titled "Methods and Apparatus for Reordering and Renaming Memory References in a Multiprocessor Computer System," filed Mar. 31, 2000 and incorporated by reference herein in its entirety, teaches a method for reordering and renaming memory references in a multiprocessor computer system having at least a first and a second processor. The first processor has a first private cache and a first buffer, and the second processor has a second private cache and a second buffer. The method includes the steps of, for each of a plurality of gated store requests received by the first processor to store a datum, exclusively acquiring a cache line that contains the datum by the first private cache, and storing the datum in the first buffer. Upon the first buffer receiving a load request from the first processor to load a particular datum, the particular datum is provided to the first processor from among the data stored in the first buffer based on an in-order sequence of load and store operations. Upon the first cache receiving a load request from the second cache for a given datum, an error condition is indicated and a current state of at least one of the processors is reset to an earlier state when the load request for the given datum corresponds to the data stored in the first buffer.

The main implementation components of one such transactional memory facility are a transaction-backup register file for holding pre-transaction GR (general register) content, a cache directory to track the cache lines accessed during the transaction, a store cache to buffer stores until the transaction ends, and firmware routines to perform various complex functions. In this section a detailed implementation is described.

IBM zEnterprise EC12 Enterprise Server Embodiment

The IBM zEnterprise EC12 enterprise server introduces transactional execution (TX) in transactional memory, and is described in part in a paper, "Transactional Memory Architecture and Implementation for IBM System z" of Proceedings Pages 25-36 presented at MICRO-45, 1-5 Dec. 2012, Vancouver, British Columbia, Canada, available from IEEE Computer Society Conference Publishing Services (CPS), which is incorporated by reference herein in its entirety.

Table 3 shows an example transaction. Transactions started with TBEGIN are not assured to ever successfully complete with TEND, since they can experience an aborting condition at every attempted execution, e.g., due to repeating conflicts with other CPUs. This requires that the program support a fallback path to perform the same operation non-transactionally, e.g., by using traditional locking schemes. This puts significant burden on the programming and software verification teams, especially where the fallback path is not automatically generated by a reliable compiler.

TABLE 3

Example Transaction Code

| | | | |
|---|---|---|---|
| loop | LHI | R0,0 | *initialize retry count=0 |
| | TBEGIN | | *begin transaction |
| | JNZ | abort | *go to abort code if CC1=0 |
| | LT | R1, lock | *load and test the fallback lock |
| | JNZ | lckbzy | *branch if lock busy |
| | ... perform operation ... | | |
| | TEND | | *end transaction |
| | ... ... ... ... | | |
| lckbzy | TABORT | | *abort if lock busy; this *resumes after TBEGIN |
| abort | JO | fallback | *no retry if CC=3 |
| | AHI | R0, 1 | *increment retry count |
| | CIJNL | R0,6, fallback | *give up after 6 attempts |
| | PPA | R0, TX | *random delay based on retry count |
| | ... potentially wait for lock to become free ... | | |
| | J | loop | *jump back to retry fallback |
| | OBTAINlock | | *using Compare&Swap |
| | ... perform operation ... | | |
| | RELEASE lock | | |
| | ... ... ... ... | | |

The requirement of providing a fallback path for aborted Transaction Execution (TX) transactions can be onerous. Many transactions operating on shared data structures are expected to be short, touch only a few distinct memory locations, and use simple instructions only. For those transactions, the IBM zEnterprise EC12 introduces the concept of constrained transactions; under normal conditions, the CPU (1214) (FIG. 12) assures that constrained transactions eventually end successfully, albeit without giving a strict limit on the number of necessary retries. A constrained transaction starts with a TBEGINC instruction and ends with a regular TEND. Implementing a task as a constrained or non-constrained transaction typically results in very comparable performance, but constrained transactions simplify software development by removing the need for a fallback path. IBM's Transactional Execution architecture is further described in z/Architecture, Principles of Operation, Tenth Edition, SA22-7832-09 published September 2012 from IBM, incorporated by reference herein in its entirety.

A constrained transaction starts with the TBEGINC instruction. A transaction initiated with TBEGINC must follow a list of programming constraints; otherwise the program takes a non-filterable constraint-violation interruption. Exemplary constraints may include, but not be limited to: the transaction can execute a maximum of 32 instructions, all instruction text must be within 256 consecutive bytes of memory; the transaction contains only forwardpointing relative branches (i.e., no loops or subroutine calls); the transaction can access a maximum of 4 aligned octowords (an octoword is 32 bytes) of memory; and restriction of the instruction-set to exclude complex instructions like decimal or floating-point operations. The constraints are chosen such that many common operations like doubly linked list-insert/delete operations can be performed, including the very powerful concept of atomic compare-and-swap targeting up to 4 aligned octowords. At the same time, the constraints were chosen conservatively such that future CPU implementations can assure transaction success without needing to adjust the constraints, since that would otherwise lead to software incompatibility.

TBEGINC mostly behaves like XBEGIN in TSX or TBEGIN on IBM's zEC12 servers, except that the floating-point register (FPR) control and the program interruption filtering fields do not exist and the controls are considered to be zero. On a transaction abort, the instruction address is set back directly to the TBEGINC instead of to the instruction after, reflecting the immediate retry and absence of an abort path for constrained transactions.

Nested transactions are not allowed within constrained transactions, but if a TBEGINC occurs within a non-constrained transaction it is treated as opening a new non-constrained nesting level just like TBEGIN would. This can occur, e.g., if a non-constrained transaction calls a subroutine that uses a constrained transaction internally. Since interruption filtering is implicitly off, all exceptions during a constrained transaction lead to an interruption into the operating system (OS). Eventual successful finishing of the transaction relies on the capability of the OS to page-in the at most 4 pages touched by any constrained transaction. The OS must also ensure time-slices long enough to allow the transaction to complete.

TABLE 4

Transaction Code Example

| TBEGINC | *begin constrained transaction |
|---|---|
| . . . perform operation . . . | |
| TEND | *end transaction |

Table 4 shows the constrained-transactional implementation of the code in Table 3, assuming that the constrained transactions do not interact with other locking-based code. No lock testing is shown therefore, but could be added if constrained transactions and lock-based code were mixed.

When failure occurs repeatedly, software emulation is performed using millicode as part of system firmware. Advantageously, constrained transactions have desirable properties because of the burden removed from programmers.

Transactional execution uses tracked read and write sets to determine if execution can be guaranteed without interaction with another process. A transaction is a sequence of instructions that look like they have all been executed without any intervening interaction with another process. Interference relates to memory location conflicts with another operation on the same memory location. Recovery from interference is expensive, and typically consists of aborting a transaction and restarting. At the same time, an over-indication of interference leads to aborting a transaction where there is no actual interference. In prior art transactional memory implementations, read sets R (1232) and write sets W (1238) are updated when in instruction executes. In accordance with the present invention, pending address queues are used or created to address and remedy unnecessary interference, and specifically related to the speculative execution of instructions within the transaction. When a speculative instruction becomes non-speculative with respect to other instructions preceding it (but not relative to the possibility of a transaction abort), an associated address is transferred from a pending address queue to the R or W set for a read and write memory access, respectively. In one embodiment, the address queues may be combined into one shared queue. Similarly, in one embodiment, the address queues can be shared with other queue structures. In one embodiment, these queues are shared with at least of a store queue or store order queue, e.g., for tracking W sets, and a load order queue, e.g., for tracking R sets. Non-speculative indicators are maintained in the cache to track R and W sets corresponding to reads and writes to memory by non-speculative instructions (i.e., instructions which are no long speculative). As shown and described herein, read set bits and write set bits are maintained in the cache in association with non-speculative read and write memory accesses, respectively, and associated read and write addresses are placed in the pending address queue(s) in association with speculative read and write memory accesses. Interference is managed and resolved by checking bits set in the cache and/or an address in the queue depending on the context of the received request.

Referring to FIG. 1, a flow chart (100) is provided illustrating a process for determining a potential conflict associated with the execution of transactions on at least two processors, a local processor (1114*a*) and a remote processor (1114*b*) as shown in FIG. 11, in a transactional memory system. As shown, a remote processor requests data (102). In response to receiving such a request, logic operatively coupled to a local processor accesses at least one local cache (104). It is then determined if the data is present in the at least one local cache (106). If the data is not present, the flow ends (108). However, if the data is present, it is then ascertained if the request received from the remote processor is a read request or a write request (110). Multiple transactions can read the same data. To determine whether interference exists for a read request, a set of alternative tests are conducted. First a test is conducted whether the request received in step (102) corresponds to a read or a write request. If the request received at (102) corresponds to a read request, control transfers to step (112). Alternatively, if the request received at (102) corresponds to a write, control transfers to step (120).

In order to determine interference for a received read request, at step (112) it is determined if a non-speculative write indicator, e.g., the write set (1238) of FIG. 12, or the TX DIRTY indicator (1052) of FIG., has been set in the cache by a local processor. Presence of the bit is evidence that requested data is the subject of a pending memory write request corresponding to a non-speculative instruction (non-speculative with respect to other instructions, but speculative with respect to a transaction abort or rollback occurring) of a transaction on the present processor, indicating that a transaction on the local processor is in the process of changing the requested data associated with the transaction. A second determination (116) is made to determine whether the address corresponding to remote request received in step (102) corresponds to an address in a the pending write queue corresponding to memory write requested executed by instructions which are speculative relative to other instructions, and speculative relative to the possible occurrence of a transaction abort or transaction rollback. If either of the determinations at step (112) and step (116) is affirmative, recovery of the transaction is initiated due to a conflict (114). A non-affirmative query at step (112) is followed by the query at step (116). If the query at step (116) is not affirmative, this is an indication that there is no interference associated with the read request. A cache line for the requested access is provided to the requesting processor (126), and the flow for checking for a conflict between a request from a remote processor and a currently active transaction on a local processor concludes (128). Accordingly, for a read request, the determination looks for a non-speculative write set indicator of non-speculative memory write access(es), e.g., as indicated by W set (1238) or TX-DIRTY (1052), in the cache (the write accesses being non-speculative with respect to other instructions, but speculative with respect to the possibility of a transaction abort or transaction rollback occurring) and speculatively executed memory write access instructions (the instructions being speculative with respect to other instructions, and to the possibility of a transaction abort or rollback) corresponding to a speculative member of a write set pending in the write queue.

The determination for a potential conflict for a write request is different from that of a read request. More specifically and as shown at step (120) and step (124), the write request interference determination tests for presence of interference with respect to non-speculative instructions of an active transaction, and speculative instructions of a transaction. At step (120), the method performs a determination for interference of the request of (102) with either a non-speculative write set indicator, e.g., W set (1238) or TX DIRTY (1052), or a non-speculative read set indicator e.g., R set (1232) or TX READ (1048), in the cache, corresponding to non-speculative memory read or memory write instructions (including but not limited to load and store instructions, respectively, and computational instructions having at least a memory write and memory read, operand, respectively, the non-speculative nature referring to the instruction being non-speculative with respect to other instructions, but being speculative with respect to the possibility of a transaction abort or transaction rollback occurring). At step (124), which takes place following a non-affirmative response to the determination at step (120), an address corresponding to the request of (102) is compared to address pending queues corresponding to speculatively executed memory read or memory write instructions (including but not limited to load and store instructions, respectively, and computational instructions having at least a memory write and memory read, operand, respectively, the speculative nature referring to the instruction being speculative with respect to other instructions, and also being speculative with respect to the possibility of a transaction abort or transaction rollback occurring). If either of determinations (120) and (124) are affirmative, corresponding as indicated with an associated address pending in one of the read and write queues, respectively, an interference of a write request received at (102) from a remote processor with an active transaction of the present local processor has been detected. In one embodiment, the read and write queues may be combined into a single queue. The read set indicator pertains to reading new data versus old data, in order to ensure a sequentially consistent transaction ordering with respect to write requests from other processors. The write set indicator tests and validates that two transactions cannot write to the same location concurrently. A positive response to at least one of the evaluation(s) at step (120) and step (124) is followed by initiating a recovery due to conflict (122). However, a negative response to both evaluation(s) at step (120) and (124) is followed by proceeding to step (126) for completion of the transaction. Accordingly, as shown as steps (112) and (120), the transaction interference resolution for read and write requests evaluates at least the write queue for a pending address corresponding to the received request and the cache for setting of a non-speculative indicator, and performs the read or write transaction based on clearance of the potential conflict.

As shown and described in FIG. 1, both a pending read queue (1082) and a pending write queue (1084) are created and used to resolve speculative transactions. More specifically, as shown and described in FIG. 1, the pending read and write queues are created and used to store addresses corresponding to speculative load and store instructions, respectively. The queues may be one shared queue of a pending request, or separate load and store pending queues. In one embodiment, the queue(s) can be shared with other queue structures, such as a store queue or load order queue. For both read and write requests, if at least one address corresponding to speculative member of a write set pending is present and detected in the write queues, then a potential conflict is detected and recovery is initiated.

Determination of an address conflict further takes into account both the size of the remote request received at (102), and of the size of the operation of the pending queue. In one embodiment, when transactional read and write sets are maintained and tracked with a granularity of a cache line two addresses correspond in the address determinations (116) and (124) when the request address of the request received at (102) and the addresses stored in the pending address queues refer to the same cache line. In at least one embodiment, pending address queues are maintained only with a number of bits to uniquely identify a cache line, and low order bits are not stored. In another embodiment, low order bits are stored. In particular, in an embodiment where an address queue serves several purposes, e.g., as a store queue and a write address queue, all bits may be maintained. In yet another embodiment, some high order bits are not stored in the pending address queue, creating the risk of vale matches. However, omitting high order bits may help improve area and power consumption as well as latency. In another embodiment, upper bits might be hashed, and a hashed set of high order bits may be stored in a pending address queue. In one such embodiment, the received requests high order bits are also hashed, and hashes are compared. In these embodiments, a hash is a unique code created to represent a plurality of high order bits with fewer bits while preferably maximizing disambiguation. A variety of hash codes, such as including but not limited to the secure hashing algorithm 1 (SHA1) are known in the art, and may be used in conjunction with the present invention. In other embodiment, interference is tracked at a granularity other than cache lines (e.g., smaller than cache lines), and two addresses are indicated to interfere with each when they refer to the same granularity.

Figure 2:
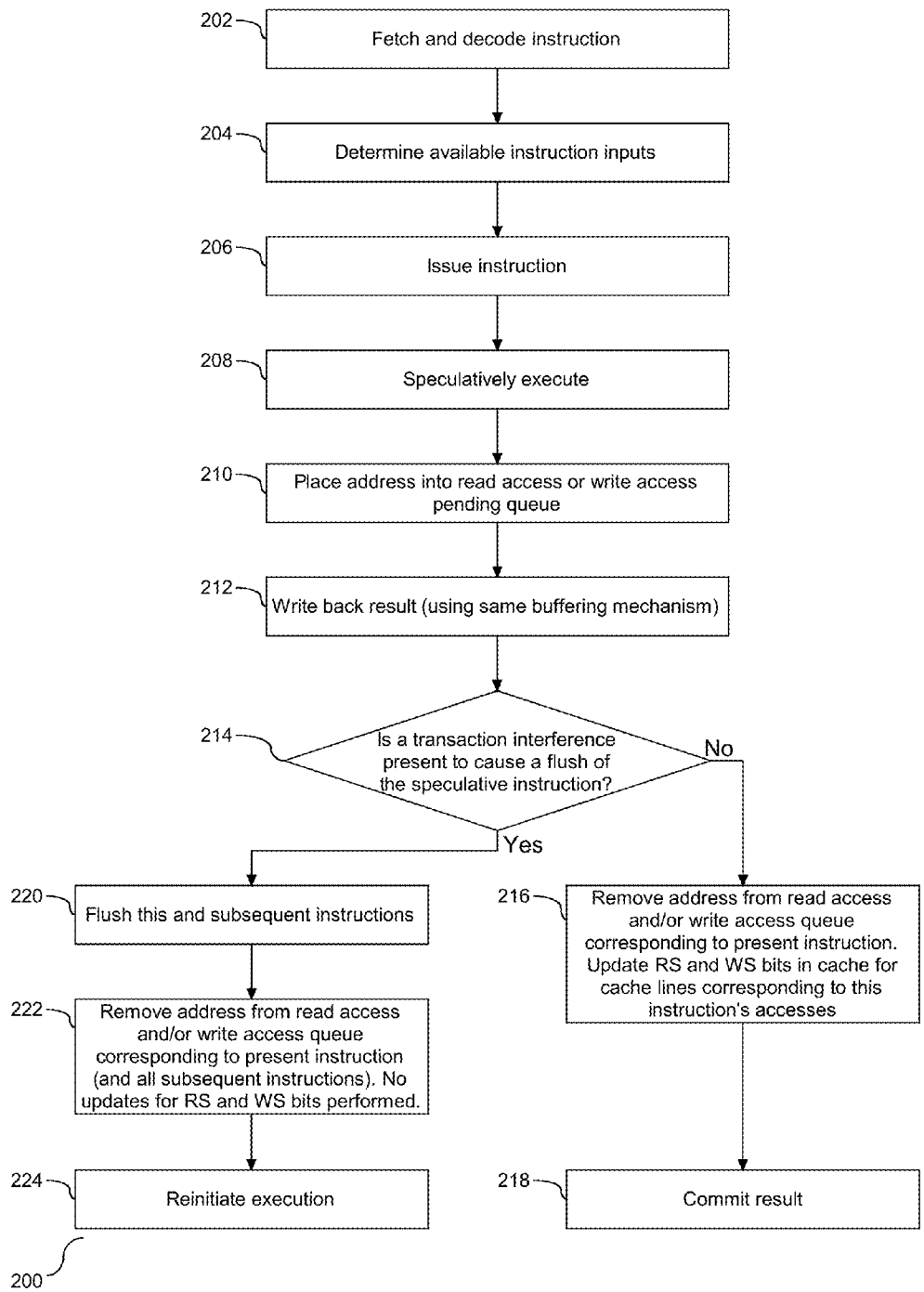
FIG. 2 depicts a flow chart illustrating the flow for instructions through a microprocessor while managing the speculative access queue(s).

Referring to FIG. 2, a flow chart (200) is provided illustrating the flow for instructions through a microprocessor while managing a speculative access queue(s). As shown, an instruction is fetched and decoded (202), and availability of instruction inputs is ascertained (204). An instruction is issued (206) and speculatively executed (208). The instruction may be in the form of a memory read request or a memory write request. In both forms, an address associated with the speculative execution is placed and stored in an associated queue, including the read access or write access pending queue corresponding to the speculative load or store instruction(s) or other instructions with memory read and write operands (210). In one embodiment, the speculative instruction is addressed by a tag, e.g. a load tag and/or a store tag. In one embodiment, the load and/or storage tag is the same tag as used for managing load and store queue(s). In another embodiment, the load access and store access pending queue is shared with a load order and store queue, or other pre-existing queues. Following placement of the address in the queue(s) at step (210), a result write back takes place (212), preferably using some buffering mechanism. In one embodiment, the buffering mechanism for speculative execution includes rename registers or future file(s). Following step (212), it is determined if a transaction interference is present so as to cause a flush of the speculative instruction (214). The instruction is then buffered, e.g., in a global completion table in accordance with prior art, until the instruction is ready to complete. While the instruction is waiting to complete, the instruction is a speculative instruction with respect to other instructions, and also speculative with respect to the possibility of a transaction abort or rollback occurring. During this period, the instruction is constantly compared against a variety of upset events, including branch mis-prediction and exception conditions that may affect the validity of the instruction execution. If a branch mis-prediction, exception or other upset event is detected during this period, control passes to step (220).

A negative response at step (214) is an indication that the instruction is complete or next to complete and is followed by removing the address corresponding to the present instruction from the read or write access queue, also referred to as a pending queue representing speculative accesses (216) with respect to other instructions. In addition, step (216) includes updating the read set and write set indicator(s) in the cache for cache lines corresponding to this instruction's access (216), and committing the result (218). In one embodiment, the update of the indicator(s) in the cache is deferred until execution of the instruction(s) is committed. When an instruction is committed, it no longer is speculative with respect to other instructions, but remains speculative with respect to the possibility of a transaction abort or rollback occurring. When a transaction rolls back (not shown), state updates corresponding to the plurality of updates effected by instructions within a transaction are rolled back. When a transaction completes (not shown), instruction effects may no longer be rolled back. The act of committing the result of the entire transaction (not shown) includes providing the associated cache line for the requested access to the remote processor.

The determination at step (214) pertains to assessing the state of the speculative instruction. A positive response at step (214) is followed by flushing this instruction and subsequent instructions (220), removing the address corresponding to the present instruction and all subsequent instructions from the read or write access queue(s) (222), and reinitiating execution (224). In addition, updates to future files, rename registers, store queues, and other processor structures having been affected by the present instruction (and its subsequent instructions) may be similarly invalidated in conjunction with the flushing of the present instruction. In a difference from step (216), the read set and write set bits are not updated. Thereafter, execution of the present instruction, or of another instruction, is reinitiated. Accordingly, execution of the speculative instruction as shown herein places an address associated with the speculative execution in the read access or write access pending queue, and subsequently removes the address from the queue(s) depending on the basis of the flush of the speculative instruction.

Figure 3:
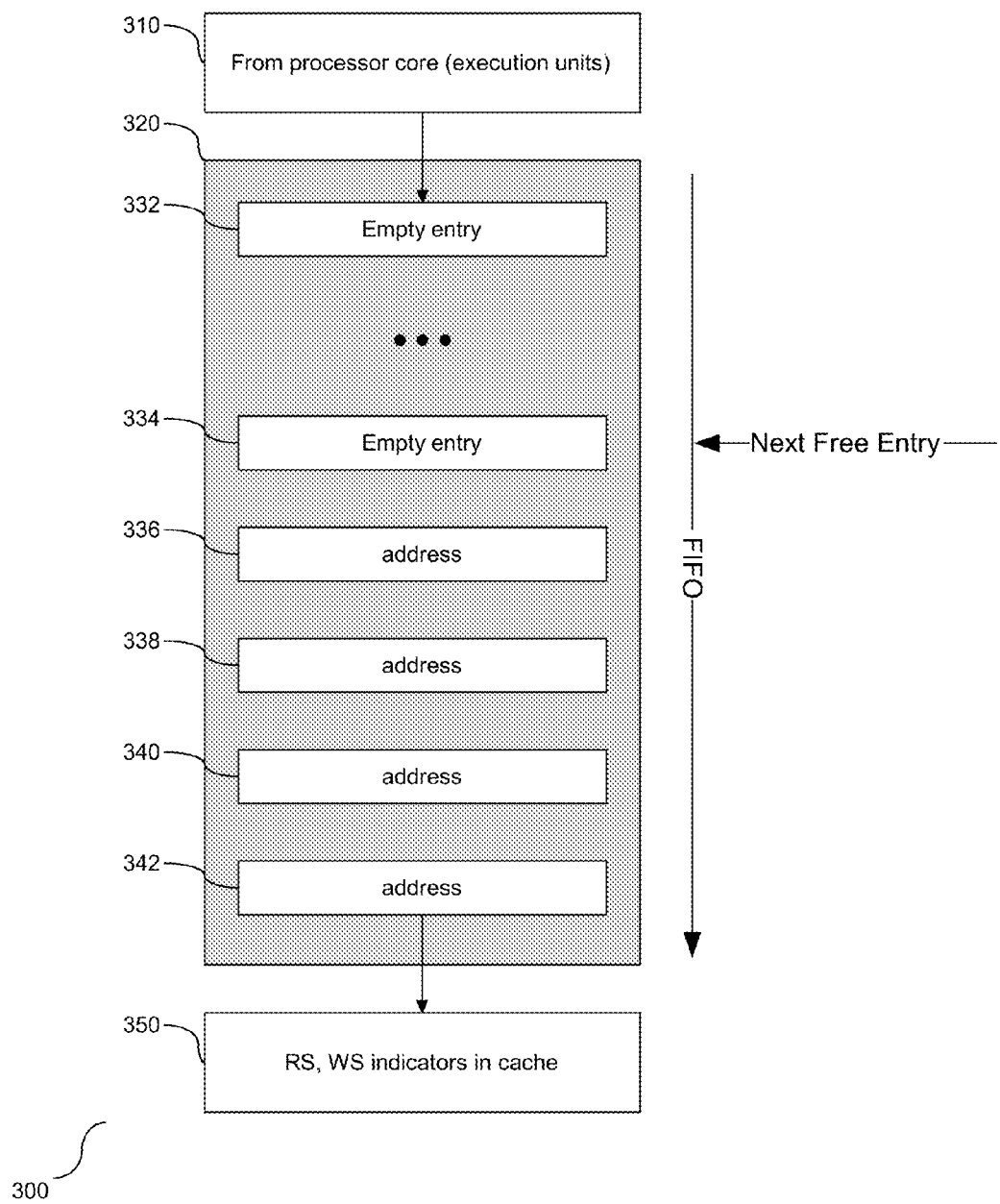
FIG. 3 depicts a block diagram illustrating a pending access queue.

As shown and described in FIGS. 1 and 2, one or more pending queues are utilized to manage speculative instructions. Referring to FIG. 3, a block diagram (300) is provided illustrating a pending access queue. As shown herein, addresses to be entered into the pending read and write address queues are received from execution units of the local processor (310) and are stored in the queue (320), which is shown with empty address slots (332) and (334) and filled address slots (336), (338), (340), and (342). The quantity of empty and filled address slots are for descriptive purposes only and should not be considered limiting. The queue (320) is shown in communication with cache (350), which as shown and described in FIG. 4 contains read and write set bits (e.g., (1232) and (1238), respectively) that are updated with the processing of instructions.

Figure 4:
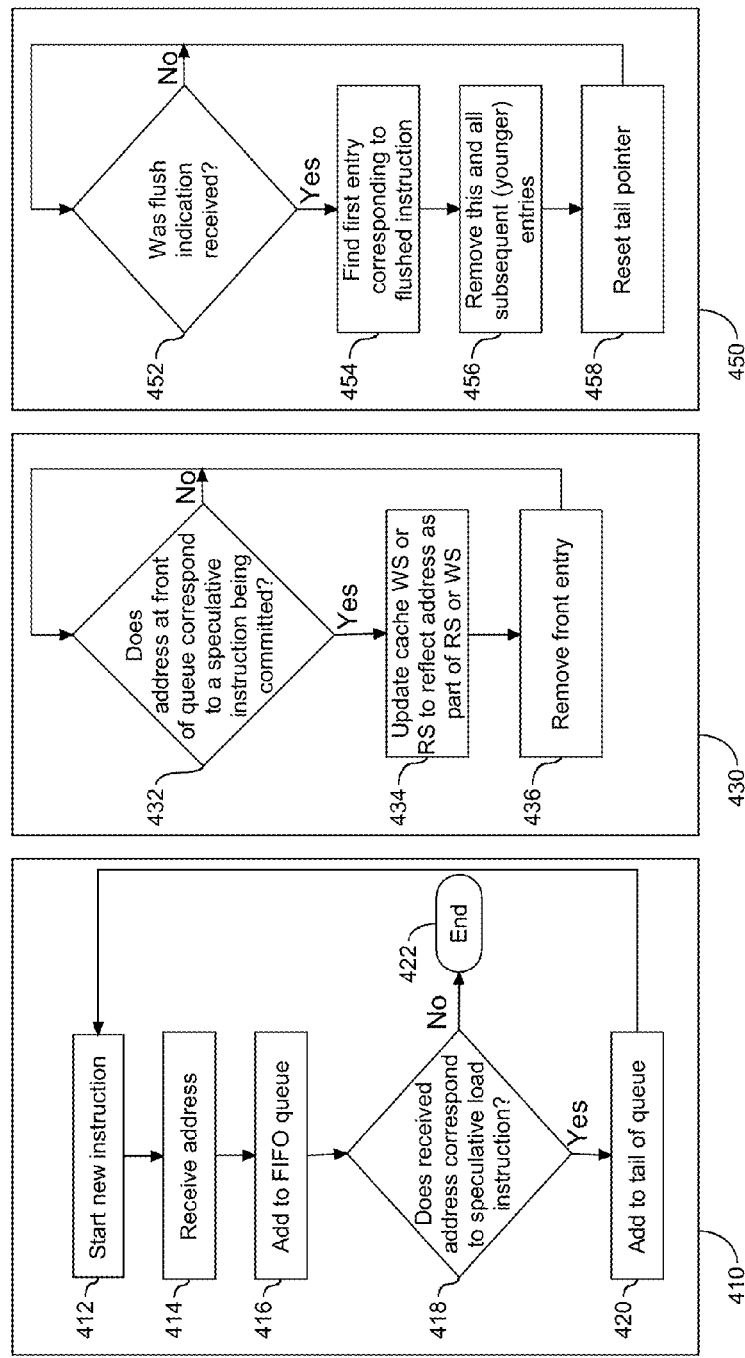
FIG. 4 depicts a set of flow charts illustrating methods performed in conjunction with management of a pending address queue.

The queue(s) shown and described in FIG. 3 is employed for interference management of instructions. In one embodiment, the queue(s) is a first in first out queue. Referring to FIG. 4, a set of flow charts (400) is provided illustrating methods performed in conjunction with the management of a pending address queue in accordance with the present invention. Although three separate flow charts are shown, the processes depicted by the charts take place concurrently. The method of flow chart (410) pertains to a received address. As shown, a new instruction is started (412), an associated load or store address for a speculative instruction is received (414), and the address is placed in the queue (416). Following step (416), it is determined if the received address corresponds to a speculative load instruction (418). An affirmative response is followed by adding the received address to the tail of the queue (420), and a non-affirmative response ends the management of the pending address queue for the received instruction (422). As shown, the process waits for receipt of a corresponding address and places the address at the end of the queue. The test shown herein for placement in the queue addresses whether there is an address that was received. Accordingly, receipt of the address enables the address to be placed in the queue for a pending speculative instruction.

In at least one embodiment, the method may be further augmented to handle a queue full condition. In one embodiment, when a queue is full, the processor stalls. In another embodiment, when a queue is full, a free queue entry may be created by committing one queue entry, e.g., such as performing step (436) on one of a front queue address, a middle queue address, a random queue address, and the received address, thereby prematurely committing an entry to R or W sets to avoid the performance penalty associated with a stall condition, but at the cost of increasing the risk of interference over indication and incurring the cost of performing unnecessary transaction aborts. An embodiment of queue overflow management is disclosed in detail herein below in conjunction with FIGS. 6 and 7.

The queue management process continually waits for notification that a speculative instruction has completed. As shown at flow chart (430), steps are shown to describe processing a commit instruction. It is determined if an address at the front of the queue corresponds to a speculative instruction being committed (432), e.g., by step (218). A negative response is followed by returning to the query at step (432). Substantially, the instruction commit process waits for the instruction corresponding to the queue entry at the front of the pending address queue entry to be committed. A positive response to the test at step (432) is followed by completing the instruction, in conjunction with updating the read set bit or write set bit in the cache (434) and removing the address corresponding to a completed instruction from the front entry of the pending address queue (436). When work on the instruction is completed, the address is and removed from the front of the queue. Accordingly, processing the commit instruction is indicated by both setting an appropriately indicated bit in the cache and updating the queue.

For various reasons and circumstance an instruction may not complete. The flow chart (450) addresses the steps of processing the flushing of an instruction that takes place when a started instruction will not complete. As shown, it is determined if a flush indication has been received (452). At such time as it is received, the first entry corresponding to the flush instruction is ascertained (454), and this entry and all subsequent entries are removed from the queue(s) (456). Following step (456), the tail pointer is reset (458). Following the reset at step (458) or a negative response to the determination at step (452), the process waits for receipt of the next flush instruction. The flush instruction is processed when it is determined that the instruction will not complete, and the instruction must be restarted.

Figure 5:
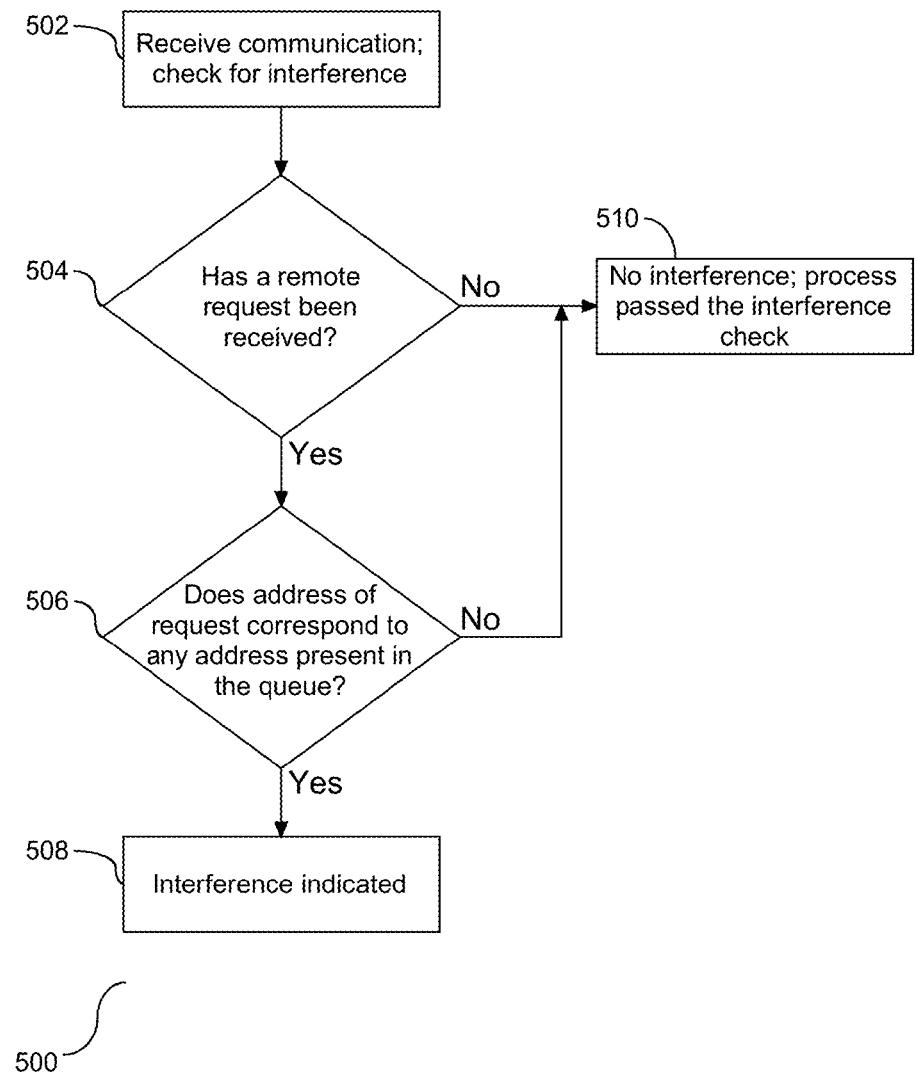
FIG. 5 depicts a flow chart illustrating steps for managing the pending queue, and specifically performing interference checks with respect to addresses corresponding to received requests from remote processors.

The addresses in the queue are referred to herein as pertaining to speculative instructions when speculative instructions are speculative relative to other instructions (as well as to the possibility of a transaction abort or rollback occurring). Referring to FIG. 5, a flow chart (500) is provided illustrating steps for managing the pending queue, and specifically performing interference checks with respect to addresses corresponding to received requests from remote processors. As shown, a communication is received to check for interference of one or more addresses in the queue (502). It is determined if a remote request has been received for a particular address (504), and if the request has been received, it is determined if the address associated with the request corresponds to any addresses present in the queue (506). A positive response to the determination at step (506) is an indication of an interference (508). However, a negative response to either of the determinations indicates that there is no interference and the process may proceed having passed the interference check (510). Accordingly, the interference check entails reviewing the queue to determine if an address is present, as such presence is an indication of possible interference that may warrant an invalidation of the transaction. In at least one embodiment, two addresses are determined to interfere with each other when they correspond to the same granule of coherence management, or transactional interference tracking. In one embodiment, coherence tracking and/or transaction state tracking is performed at a cache line level. In another embodiment, it is performed at a sub-cache line level. Yet other embodiments may use yet other coherence granules.

Figure 6:
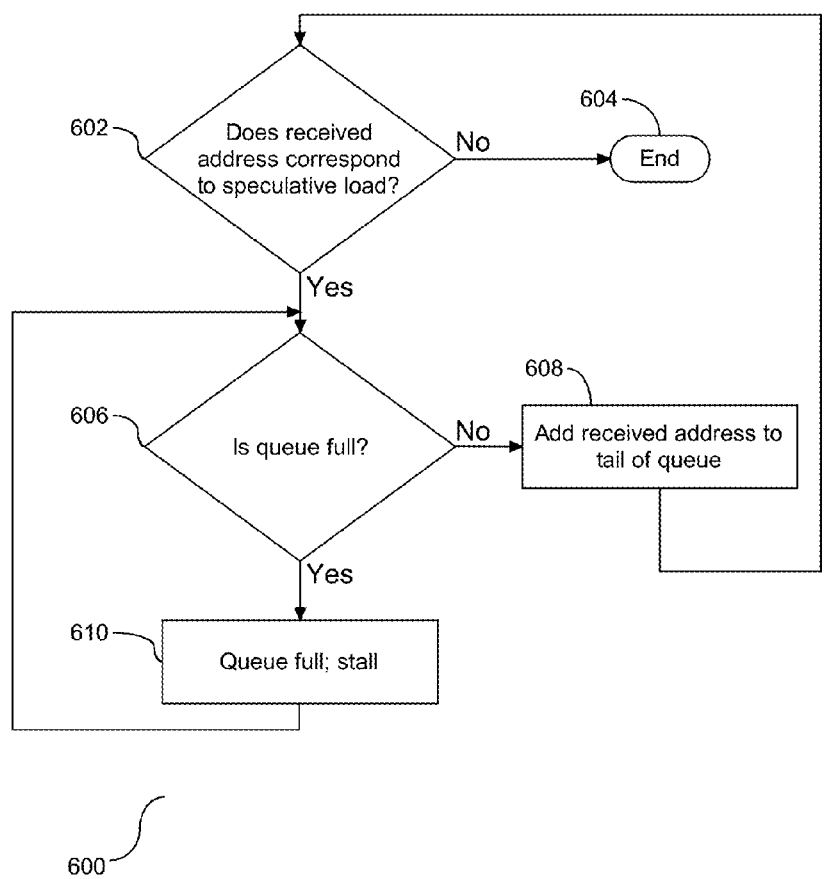
FIG. 6 depicts a flow chart illustrating management of the queue, and more specifically, addressing overflow of the queue.

As shown and described in FIGS. 1-5, a pending address queue is provided and employed to manage interference associated with a transaction. It is understood that the queue itself requires management. Referring to FIG. 6 a flow chart (600) is provided illustrating management of the queue, and more specifically, addressing overflow of the queue. The queue is a pending address queue, and the size of the queue is finite. The queue may be subject to overflow or configured to make forward progress and tolerate some over-indication. As shown, it is determined if an address corresponding to a speculative load is received in the queue (602). A negative response to the determination ends the management query for this transaction in relation to the speculative load (604). In one embodiment, review of the queue for overflow is conducted in response to receipt of a load or store (or other memory access instruction. However, a positive response to the determination at step (602) is following by determining if the queue is full (606). A full queue may be problematic, since interference is established based on reviewing the queue for a corresponding address. If the queue is full, the process may need to stall (608) until such time as there is space in the queue for the speculative load, after which the process returns to step (606). The stall may end at such time as a prior instruction address in the queue, e.g. at the front of the queue, is completed. At such time as there is space in the queue, the received address associated with the speculative load is added to the tail of the queue (610), since the queue is a first in first out queue. In one embodiment, the stall may be replaced by some form of forward progress, so that there is a toleration of over-indication. The management of the queue as shown herein is useful when the queue is shared with a load order queue, a store order queue, etc. Accordingly, the queue requires some management to ensure that received instructions are properly managed and not lost or otherwise discarded in view of a full queue.

Figure 7:
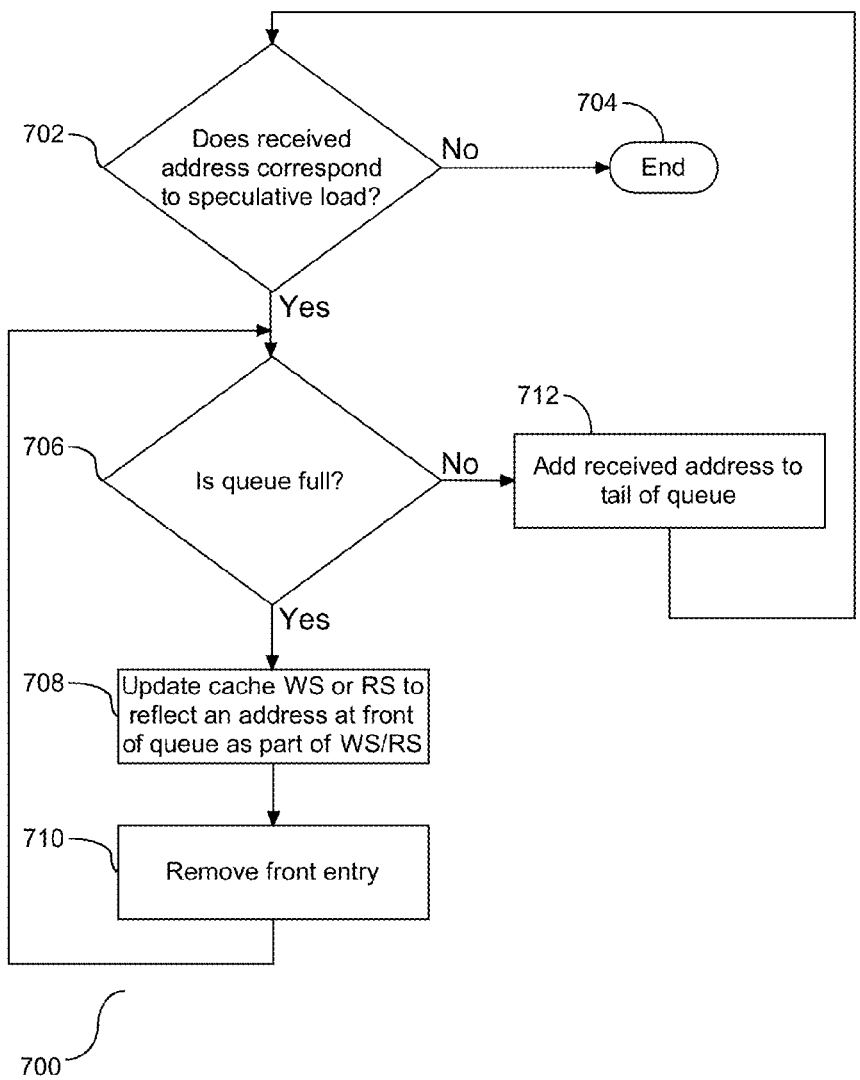
FIG. 7 depicts a flow chart illustrating another form of management of the pending address queue that does not stall the update of the queue.

Referring to FIG. 7, a flow chart (700) is provided illustrating another form of management of the pending address queue that does not stall the update of the queue, as shown and described in FIG. 6. As shown herein, it is determined if an address corresponding to a speculative load is received in the queue (702). A negative response to the determination ends the management query for this transaction in relation to the speculative load (704). More specifically, either there is no transaction or the received transaction does not correspond to a speculative transaction that would entail use of the queue. A positive response to the determination is followed by a query to determine if the queue is full (706). As described above, a full queue requires management so that the received instructions are not lost or discarded. If the queue is full, the write set or read set bit is updated in the cache to reflect an address at the front of the queue as part of the write set of read set (708). After the cache is updated, the associated entry is removed from the queue (710), i.e. the front entry of the queue is removed, thereby making space for the incoming address. The process shown herein optimizes the performance by moving the oldest speculative address in the queue to write set or read set. In one embodiment, the incoming speculative address may be moved to the write set or read set. Following step (710) or an indication that the queue is not full, e.g. a negative response to the determination at step (706), the received address associated with the speculative load is added to the tail of the queue (712). Accordingly, the process for management of the queue may take on different forms while considering the age of the addresses in the queue. In another aspect of the present invention, the same process is applied for a pending store address queue when a store instruction is received, or for a combined load/store address queue when a load or a store address is received.

As shown and described in FIGS. 1-7 instructions are received in one or more pending address queues, and are flushed from the queue based on different scenarios. However, in some circumstance, the speculative instruction may be in a state where it is not known whether there will be an over-indication. Specifically, the over-indication addresses a potential transaction interference exclusively conflicting with a speculative instruction.

Figure 8A:
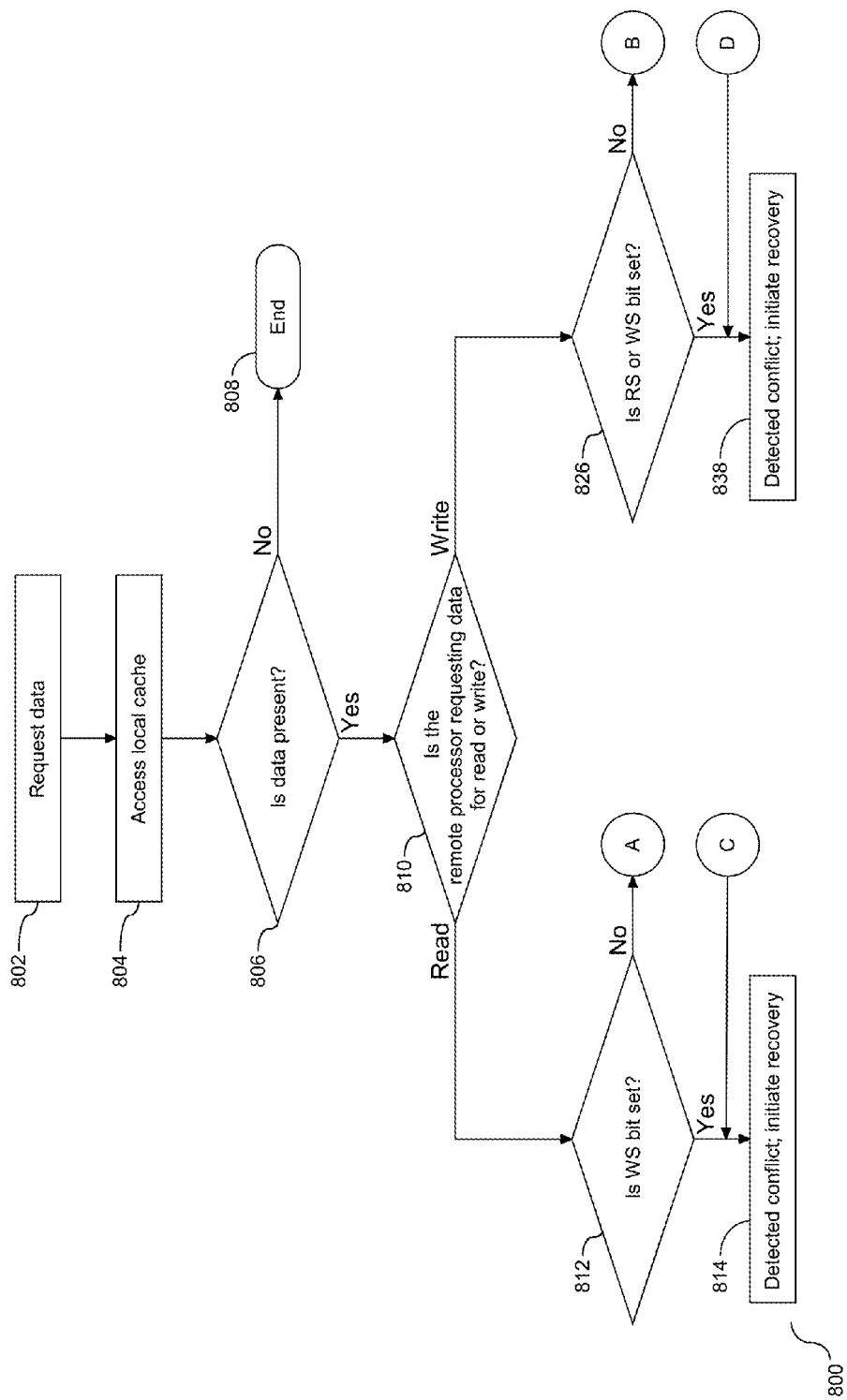
FIGS. 8A-8C depict a flow chart illustrating a process for holding a response to a requesting processor based on potential interference associated with a transaction.
Figure 8B:
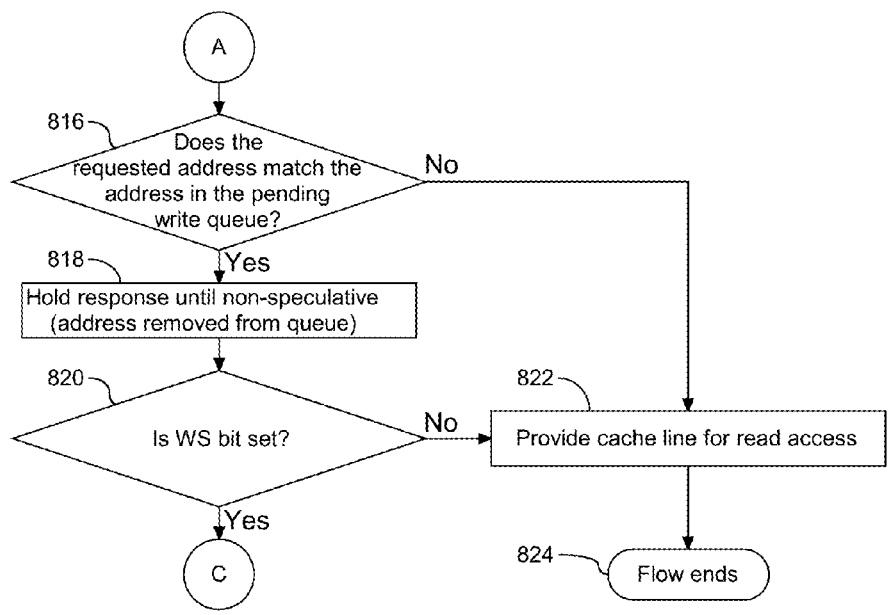
Figure 8C:
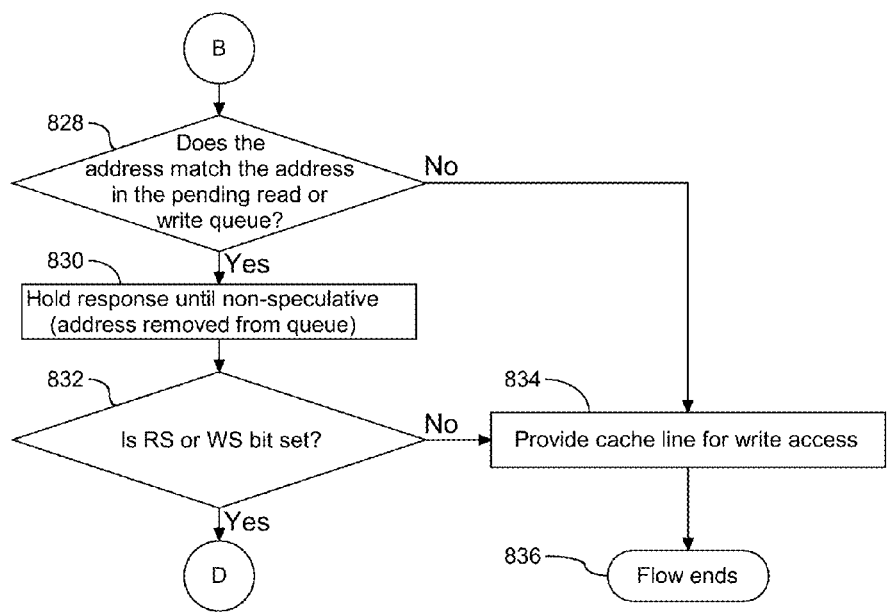

Referring to FIGS. 8A-8C, a flow chart (800) is provided illustrating a process for holding a response to a requesting processor based on potential interference associated with a transaction. Similar to the process shown and described in FIG. 1, a remote processor requests data (802). In response to receiving such a request, logic operatively coupled to a local processor accesses at least one local cache (804). It is then determined if the data is present in the accessed local cache (806). If the data is not present, the flow ends (808). However, if the data is present, it is then ascertained if the request received from the remote processor requests the data for a read request or a write request (810). Multiple transactions can read the same data. To determine whether interference exits for a read request, a set of alternative tests is conducted. First, a test is conducted to determine whether the request received in step (802) corresponds to a read or a write request. If the request received at step (802) corresponds to a read request, control transfers to step (812). Alternatively, if the request received at step (802) corresponds to a write, control transfers to step (826).

Figure 10:
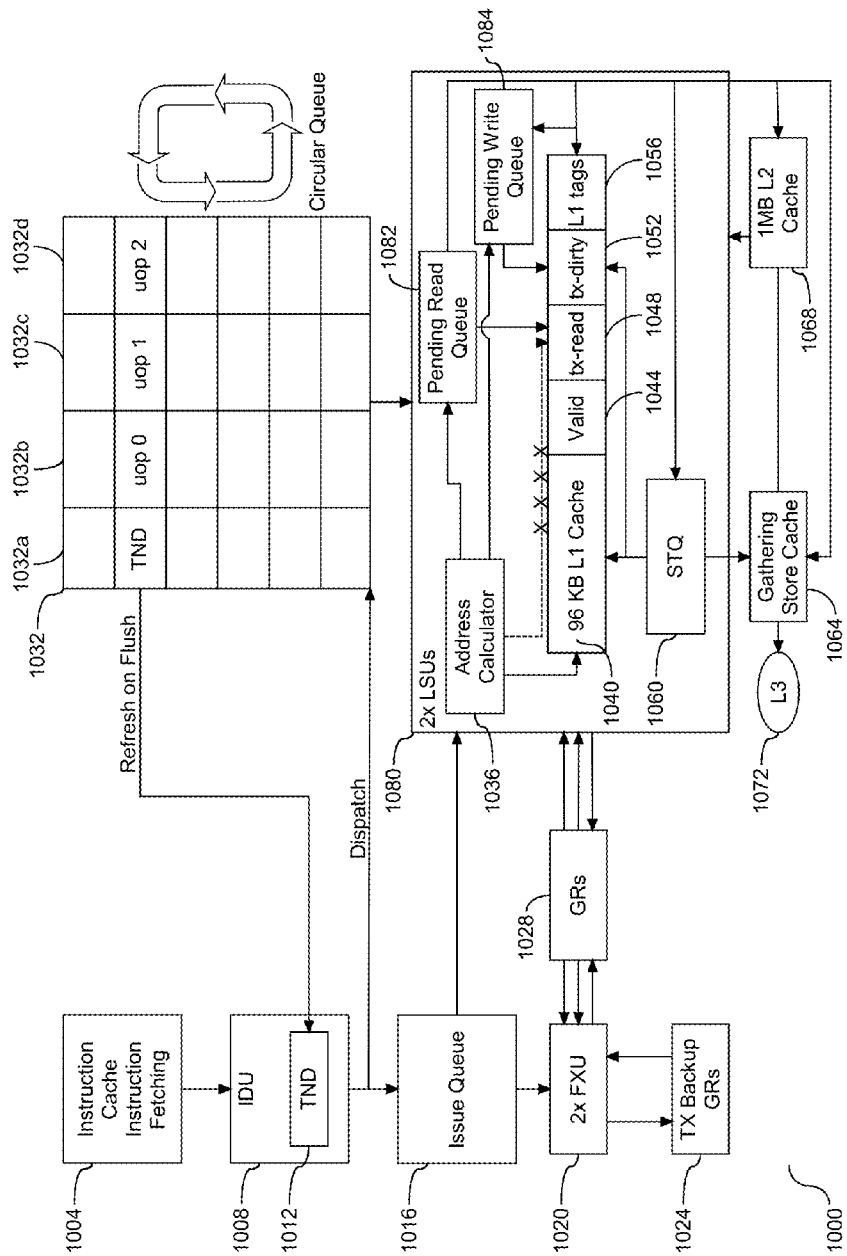
FIG. 10 depicts a block diagram showing components of an example CPU, in accordance with the present embodiments.

In order to determine interference for a received read request, at step (812) it is determined if a non-speculative write indicator, e.g., the write set (1238) of FIG. 12, or the TX DIRTY indicator (1052) of FIG. 10, has been set in the cache by a local processor. Presence of the bit is evidence that that requested data is the subject of a pending memory write request corresponding to a non-speculative instruction (non-speculative with respect to other instructions, but speculative with respect to a transaction abort or rollback occurring) of a transaction on the present processor, indicating that a transaction on the local processor may be in the process of changing the requested data associated with the transaction. An affirmative response to the determination at step (812) is followed by initiating recovery of the transaction due to a conflict (814). If the response at step (812) is non-affirmative, a second determination (816) is made to determine whether the address corresponding to the remote request received in step (802) corresponds to an address in the pending write queue corresponding to a memory write request executed by instructions which are speculative relative to other instructions, and speculative relative to the possible occurrence of a transaction abort or transaction rollback. If a response to the determination at step (816) is affirmative, a hold is placed on the read request until the request is determined to be non-speculative (818), e.g. until the address is removed from the queue. Following step (818), it is again determined if a non-speculative write indicator, e.g., the write set (1238) of FIG. 12, or the TX DIRTY indicator (1052) of FIG. 10, has been set in the cache by a local processor (820). An affirmative response at step (820) is proceeds to step (814) to initiate recovery of the transaction due to a conflict. However, a non-affirmative response to the determinations at either step (816) or (820) is an indication that there is no interference associated with the read request. A cache line for the requests access is provided to the requesting processor (822), and the flow for checking for a conflict between a request from a remote processor and a currently active transaction on a local processor concludes (824). As shown, for a read request, one or more over-indication tests are used to hold a response to the received request until the speculative instruction is committed or flushed. In another embodiment, the over-indication test of step (820) can be performed by determining whether an instruction corresponding to an interfering address pending queue entry is flushed (no recovery necessary at step (822)), or is committed and initiating recovery at step (814) responsive to a detected interference.

The determination for a potential conflict for a write request is different from that of a read request. More specifically and as shown at step (826), the write request tests for presence of interference with respect to non-speculative instructions of an active transaction, and speculative instructions of a transaction. At step (826), the method performs a determination for interference of the request of (802) with either a non-speculative write set indicator, e.g. W set (1238) or TX DIRTY (1052), or a non-speculative read set indicator, e.g. R set (1232) or TX READ (1048), in the cache, corresponding to non-speculative memory read or memory write instructions (including but not limited to load and store instructions, respectively, and computational instructions having at least a memory write and memory read, operand, respectively, the non-speculative nature referring to the instruction being non-speculative with respect to other instructions, but being speculative with respect to the possibility of a transaction abort or transaction rollback occurring). Following a non-affirmative response to the determination at step (826) is following by a second determination (828) to determine whether the address corresponding to the remote request received in step (802) corresponds to an address in the pending read queue or the pending write queue corresponding to a memory write request executed by instructions which are speculative relative to other instructions, and speculative relative to the possible occurrence of a transaction abort or transaction rollback. If a response to the determination at step (828) is affirmative, a hold is placed on the write request until the request is determined to be non-speculative (830), e.g. until the address is removed from the queue. Following step (830), the method performs a determination for interference (832) of the request of (802) with either a non-speculative write set indicator, e.g. W set (1238) or TX DIRTY (1052), or a non-speculative read set indicator, e.g. R set (1232) or TX READ (1048), in the cache, corresponding to non-speculative memory read or memory write instructions. An affirmative response at step (832) proceeds to step (838) to initiate recovery of the transaction due to a conflict. However, a non-affirmative response to the determinations at either step (828) or (832) is an indication that there is no interference associated with the write request. A cache line for the requested access is provided to the requesting processor (834), and the flow for checking for a conflict between a request from a remote processor and a currently active transaction on a local processor concludes (836). As shown, for a write request, one or more over-indication tests are used to hold a response to the received request until the speculative instruction is committed or flushed. In another embodiment, the over-indication test of step (832) can be performed by determining whether an instruction corresponding to an interfering address pending queue entry is flushed (no recovery necessary at step (834)), or is committed and initiating recovery at step (838) responsive to a detected interference.

As shown and described in FIGS. 8A-8C, the transaction interference resolution determines a potential interference exclusively conflicting with a speculative instruction. Based on the potential interference, one or two over-indication tests are conducted, and in limited circumstances a response to the requesting processor is placed on hold until the speculative instruction is either committed or flushed. The act of placing the transaction on hold does not place the transaction in this state indefinitely, and effectively defers the response to the requesting processor, e.g. remote processor, and prevents the requesting processor from performing a transaction resolution.

Figure 9A:
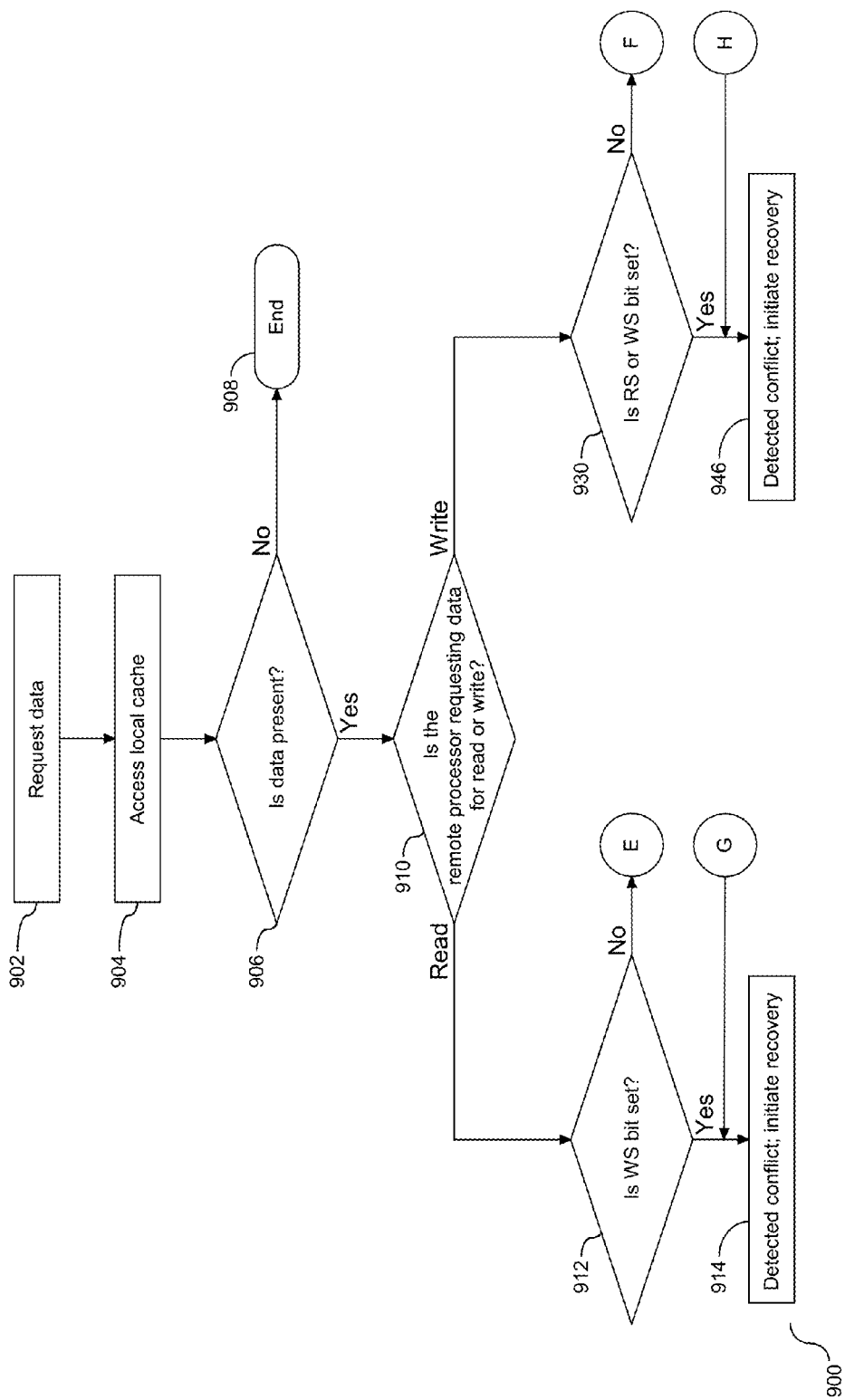
FIGS. 9A-9C depicts a flow chart illustrating another process for holding a response to a requesting processor based on potential interference associated with a transaction.
Figure 9B:
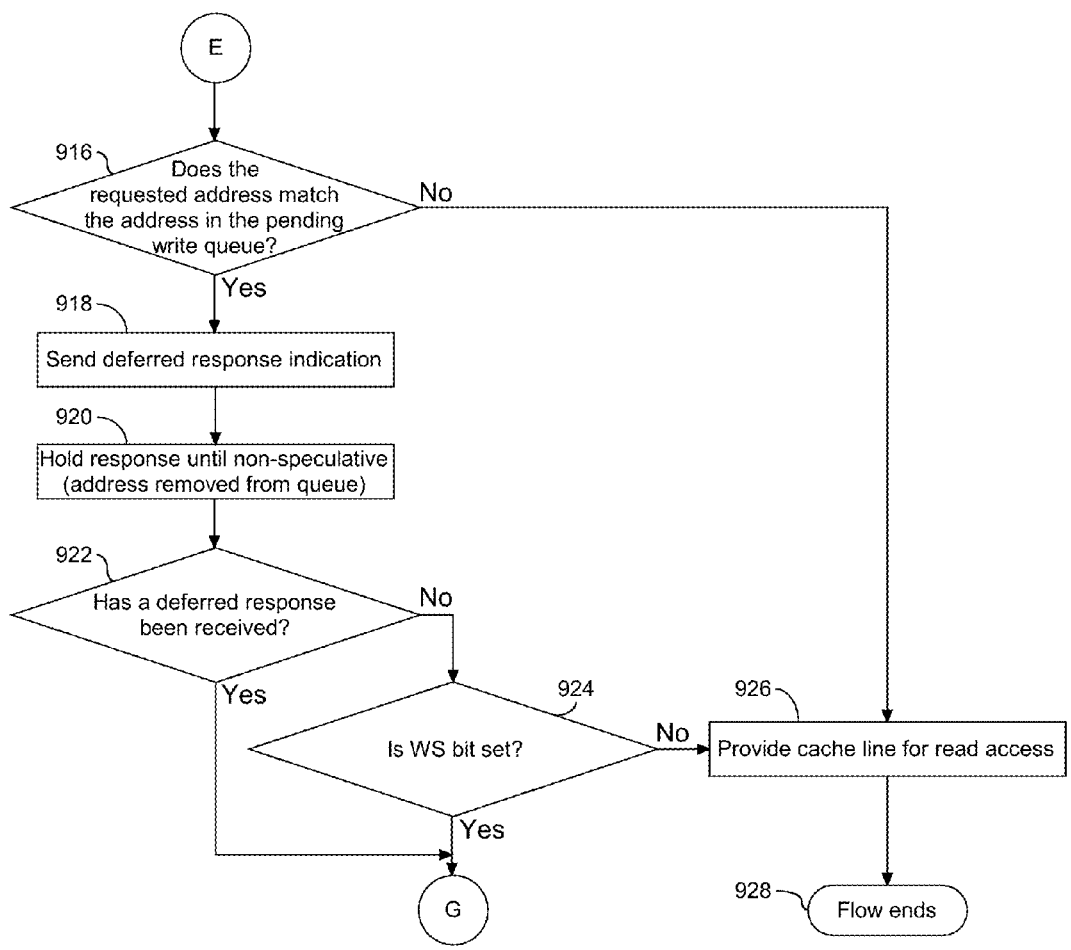
Figure 9C:
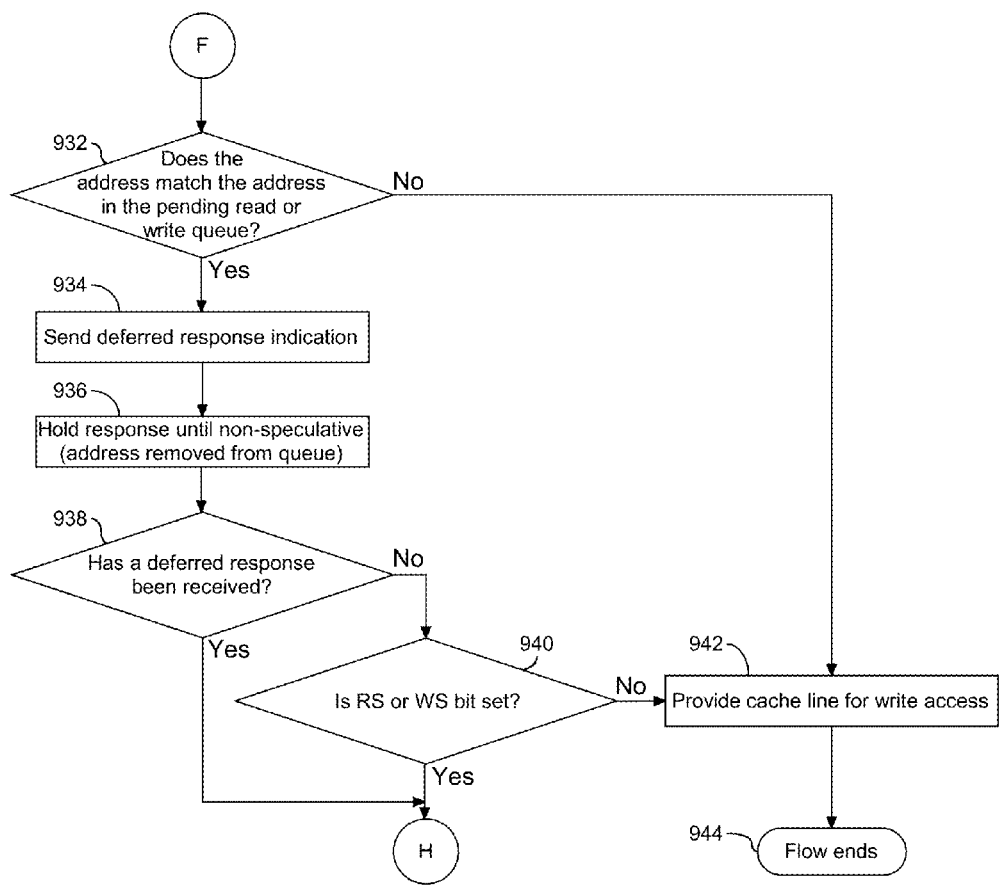

Referring to FIGS. 9A-9C, a flow chart (900) is provided illustrating another process for holding a response to a requesting processor based on potential interference associated with a transaction. Similar to the process shown and described in FIGS. 1 and 8A-8C, a remote processor requests data (902). In response to receiving such a request, logic operatively coupled to a local processor accesses at least one local cache (904). It is then determined if the data is present in the accessed local cache (906). If the data is not present, the flow ends (908). However, if the data is present, it is then ascertained if the request received from the remote processor requests the data for a read request or a write request (910). Multiple transactions can read the same data. To determine whether interference exits for a read request, a set of alternative tests is conducted. First, a test is conducted to determine whether the request received in step (902) corresponds to a read or a write request. If the request received at step (902) corresponds to a read request, control transfers to step (912). Alternatively, if the request received at step (902) corresponds to a write, control transfers to step (930).

In order to determine interference for a received read request, at step (912) it is determined if a non-speculative write indicator, e.g., the write set (1238) of FIG. 12, or the TX DIRTY indicator (1052) of FIG. 10, has been set in the cache by a local processor. Presence of the bit is evidence that that requested data is the subject of a pending memory write request corresponding to a non-speculative instruction (non-speculative with respect to other instructions, but speculative with respect to a transaction abort or rollback occurring) of a transaction on the present processor, indicating that a transaction on the local processor may be in the process of changing the requested data associated with the transaction. An affirmative response to the determination at step (912) is followed by initiating recovery of the transaction due to a conflict (914). If the response at step (912) is non-affirmative, a second determination (916) is made to determine whether the address corresponding to the remote request received in step (902) corresponds to an address in the pending write queue corresponding to a memory write request executed by instructions which are speculative relative to other instructions, and speculative relative to the possible occurrence of a transaction abort or transaction rollback. If a response to the determination at step (916) is affirmative, a deferred response indication is sent to the requesting processor (918), and a hold is placed on the read request until the request is determined to be non-speculative (920), e.g. until the address is removed from the queue. Following the hold at step (920), it is determined if a deferred response has been received (922). In one embodiment, the hold at step (920) is limited in time, and following the expiration of the limited, the test at step (922) is conducted. A deferred response at step (922) is an indication that there is a conflict, and recovery is initiated (914). However, if the deferred response has not been received at step (922), a second over indication test takes place to determine if a non-speculative write indicator, e.g., the write set (1238) of FIG. 12, or the TX DIRTY indicator (1052) of FIG. 10, has been set in the cache by a local processor (924). An affirmative response at step (924) is proceeds to step (914) to initiate recovery of the transaction due to a conflict. However, a non-affirmative response to the determinations at either step (916) or (924) is an indication that there is no interference associated with the read request. A cache line for the requested access is provided to the requesting processor (926), and the flow for checking for a conflict between a request from a remote processor and a currently active transaction on a local processor concludes (928). Accordingly, for a read request, one or more over-indication tests are used to hold a response to the received request until the speculative instruction is committed or flushed.

The determination for a potential conflict for a write request is different from that of a read request. More specifically and as shown at step (930), the write request tests for presence of interference with respect to non-speculative instructions of an active transaction, and speculative instructions of a transaction. At step (930), the method performs a determination for interference of the request of (902) with either a non-speculative write set indicator, e.g. W set (1238) or TX DIRTY (1052), or a non-speculative read set indicator, e.g. R set (1232) or TX READ (1048), in the cache, corresponding to non-speculative memory read or memory write instructions (including but not limited to load and store instructions, respectively, and computational instructions having at least a memory write and memory read, operand, respectively, the non-speculative nature referring to the instruction being non-speculative with respect to other instructions, but being speculative with respect to the possibility of a transaction abort or transaction rollback occurring). Following a non-affirmative response to the determination at step (930) is following by a second determination (932) to determine whether the address corresponding to the remote request received in step (902) corresponds to an address in the pending read queue or the pending write queue corresponding to a memory write request executed by instructions which are speculative relative to other instructions, and speculative relative to the possible occurrence of a transaction abort or transaction rollback. If a response to the determination at step (932) is affirmative, a deferred response indication is sent to the requesting processor (934), and a hold is placed on the write request until the request is determined to be non-speculative (936), e.g. until the address is removed from the queue. Following the hold at step (936), it is determined if a deferred response has been received (938). In one embodiment, the hold at step (936) is limited in time, and following the expiration of the limit, the test at step (938) is conducted. A deferred response at step (938) is an indication that there is a conflict, and recovery is initiated (946). However, if the deferred response has not been received at step (938), a second over indication test takes place to determine if a non-speculative write indicator, e.g., the write set (1238) of FIG. 12, or the TX DIRTY indicator (1052) of FIG. 10, has been set in the cache by a local processor (940). An affirmative response at step (940) proceeds to step (946) to initiate recovery of the transaction due to a conflict. However, a non-affirmative response to the determinations at either step (932) or (940) is an indication that there is no interference associated with the read request. A cache line for the requested access is provided to the requesting processor (942), and the flow for checking for a conflict between a request from a remote processor and a currently active transaction on a local processor concludes (944). Accordingly, for a write request, one or more over-indication tests are used to hold a response to the received request until the speculative instruction is committed or flushed.

The read set indicator pertains to reading new data versus old data. The write set indicator tests and validates that two transactions cannot write to the same location. A non-affirmative response to the evaluation(s) at step (930) is followed by a first of two possible over-indication tests associated with the write request evaluation. The first test evaluates for presence of a write set indicator or a read set indicator in the cache (932), and a second over indication test takes place to determine if the non-speculative write indicator or non-speculative read indicator is present in the cache (940).

The process for holding a response to a requesting processor based on potential interference associated with a transaction as shown and described herein includes two steps in addition to the over-indication test. These two steps are present for both the read transaction processing and the write transaction processing. The steps include sending a deferred response indicator to the requesting processor, which effectively communicates to the processor that there will be a delay in processing.

The over-indication tests shown and described in FIGS. 8 and 9, delay interference processing in response to an interference with a speculative access, i.e., with an address in a pending access queue when the read and/or write indicator(s) in the cache are not present, so that the conflict is exclusive with the speculative access. These processes do not just avoid interference, but take it further by determining whether the speculative instruction will complete. Then, if the speculative instruction completes, the interference can be indicated and recovery initiated, and if the speculative instruction does not complete a non-interference can be indicated and the data provided to the requesting processor. In one embodiment, a deadlock detection is provided, such as a time-out or a new protocol response, where any processor that is deferring a response must not allow a load or store for which it has received a deferring response to hold up instruction commit since that creates a potential for deadlock. Instead, when a processor issues a deferring response in response to a remote request it has received (steps (918), and (934)), it must not allow a request that it has issued and for which it has received a deferred response from another processor to halt forward progress. Rather, optionally after an initial time-out, i.e., after allowing for a lapse of time in which the situation might resolve when a non-circular dependence is present, such a processor must abort its own transaction. In a variety of embodiment, rules may be provided wherein between two dependent processes, only one initiate's recovery. In one embodiment, a processor with a higher thread ID initiates recovery on a possible deadlock, and a processor with a lower processor number does not. In another embodiment, lower/higher, even/odd, or token-based determinations are used (e.g., a process may have an "immunity token".). In at least some embodiments, these conditions are changed during operation of the system to balance system load, establish fairness and increase system utilization.

With reference to FIG. 10, the IBM zEnterprise EC12 processor introduced the transactional execution facility. The processor can decode 3 instructions per clock cycle; simple instructions are dispatched as single micro-ops, and more complex instructions are cracked into multiple micro-ops. The micro-ops (Uops (1032*b*)) are written into a unified issue queue (1016)), from where they can be issued out-of-order. Up to two fixed-point, one floating-point, two load/store, and two branch instructions can execute every cycle. A Global Completion Table (GCT) (1032) holds every micro-op (1032*b*) and a transaction nesting depth (TND) (1032*a*). The GCT (1032) is written in-order at decode time, tracks the execution status of each micro-op (1032*b*), and completes instructions when all micro-ops (1032*b*) of the oldest instruction group have successfully executed.

The level 1 (L1) data cache (1040) is a 96 KB (kilo-byte) 6-way associative cache with 256 byte cache-lines and 4 cycle use latency, coupled to a private 1 MB (mega-byte) 8-way associative 2nd-level (L2) data cache (1068) with 7 cycles use-latency penalty for L1 (1040) misses. The L1 (1040) cache is the cache closest to a processor and Ln cache is a cache at the nth level of caching. Both L1 (1040) and L2 (1068) caches are store-through. Six cores on each central processor (CP) chip share a 48 MB 3rd-level store-in cache, and six CP chips are connected to an off-chip 384 MB 4th-level cache, packaged together on a glass ceramic multi-chip module (MCM). Up to 4 multi-chip modules (MCMs) can be connected to a coherent symmetric multi-processor (SMP) system with up to 144 cores (not all cores are available to run customer workload).

Coherency is managed with a variant of the MESI protocol. Cache-lines can be owned read-only (shared) or exclusive; the L1 (1040) and L2 (1068) are store-through and thus do not contain dirty lines. The L3 (1072) and L4 caches (not shown) are store-in and track dirty states. Each cache is inclusive of all its connected lower level caches.

Coherency requests are called "cross interrogates" (XI) and are sent hierarchically from higher level to lower-level caches, and between the L4s. When one core misses the L1 (1040) and L2 (1068) and requests the cache line from its local L3 (1072), the L3 (1072) checks whether it owns the line, and if necessary sends an XI to the currently owning L2 (1068)/L1 (1040) under that L3 (1072) to ensure coherency, before it returns the cache line to the requestor. If the request also misses the L3 (1072), the L3 (1072) sends a request to the L4 (not shown), which enforces coherency by sending XIs to all necessary L3s under that L4, and to the neighboring L4s. Then the L4 responds to the requesting L3 which forwards the response to the L2 (1068)/L1 (1040).

Note that due to the inclusivity rule of the cache hierarchy, sometimes cache lines are XI'ed from lower-level caches due to evictions on higher-level caches caused by associativity overflows from requests to other cache lines. These XIs can be called "LRU XIs", where LRU stands for least recently used.

Making reference to yet another type of XI requests, Demote-XIs transition cache-ownership from exclusive into read-only state, and Exclusive-XIs transition cache ownership from exclusive into invalid state. Demote-XIs and Exclusive-XIs need a response back to the XI sender. The target cache can "accept" the XI, or send a "reject" response if it first needs to evict dirty data before accepting the XI. The L1 (1040)/L2 (1068) caches are store through, but may reject demote-XIs and exclusive XIs if they have stores in their store queues that need to be sent to L3 before downgrading the exclusive state. A rejected XI will be repeated by the sender. Read-only-XIs are sent to caches that own the line read-only; no response is needed for such XIs since they cannot be rejected. The details of the SMP protocol are similar to those described for the IBM z10 by P. Mak, C. Walters, and G. Strait, in "IBM System z10 processor cache subsystem microarchitecture", IBM Journal of Research and Development, Vol 53:1, 2009, which is incorporated by reference herein in its entirety.

Transactional Instruction Execution

FIG. 10 depicts example components of an example transactional execution environment, including a CPU and caches/components with which it interacts. The instruction decode unit (1008) (IDU) keeps track of the current transaction nesting depth (1012) (TND). When the IDU (1008) receives a TBEGIN instruction (1004), the nesting depth (1012) is incremented, and conversely decremented on TEND instructions. The nesting depth (1012) is written into the GCT (1032) for every dispatched instruction. When a TBEGIN or TEND is decoded on a speculative path that later gets flushed, the IDU's (1008) nesting depth (1012) is refreshed from the youngest GCT (1032) entry that is not flushed. The transactional state is also written into the issue queue (1016) for consumption by the execution units, mostly by the Load/Store Unit (LSU) (1080), which also has an effective address calculator (1036) included in the LSU (1080). The TBEGIN instruction may specify a transaction diagnostic block (TDB) for recording status information, should the transaction abort before reaching a TEND instruction. In addition, the Load/Store Unit (1080) is shown with two queues (1082) and (1084), referring the pending read queue and pending write queue respectively. The functionality of these queues is described above in FIGS. 1-9. In one embodiment, the queues (1082) and (1084) may be combined into a single queue while maintaining the functionality to support transaction execution.

Similar to the nesting depth, the IDU (1008)/GCT (1032) collaboratively track the access register/floating-point register (AR/FPR) modification masks through the transaction nest; the IDU (1008) can place an abort request into the GCT (1032) when an AR/FPR-modifying instruction is decoded and the modification mask blocks that. When the instruction becomes next-to-complete, completion is blocked and the transaction aborts. Other restricted instructions are handled similarly, including TBEGIN if decoded while in a constrained transaction, or exceeding the maximum nesting depth.

An outermost TBEGIN is cracked into multiple micro-ops depending on the GR-Save-Mask; each micro-op (1032*b*) (including, for example μop 0, μop 1, and uop2) will be executed by one of the two fixed point units (FXUs) (1020) to save a pair of GRs (1028) into a special transaction-backup register file (1024), that is used to later restore the GR (1028) content in case of a transaction abort. Also the TBEGIN spawns micro-ops (1032*b*) to perform an accessibility test for the TDB if one is specified; the address is saved in a special purpose register for later usage in the abort case. At the decoding of an outermost TBEGIN, the instruction address and the instruction text of the TBEGIN are also saved in special purpose registers for a potential abort processing later on.

TEND and NTSTG are single micro-op (1032*b*) instructions; NTSTG (non-transactional store) is handled like a normal store except that it is marked as non-transactional in the issue queue (1016) so that the LSU (1080) can treat it appropriately. TEND is a no-op at execution time, the ending of the transaction is performed when TEND completes.

As mentioned, instructions that are within a transaction are marked as such in the issue queue (1016), but otherwise execute mostly unchanged; the LSU (1080) performs isolation tracking as described in the next section.

Since decoding is in-order, and since the IDU (1008) keeps track of the current transactional state and writes it into the issue queue (1016) along with every instruction from the transaction, execution of TBEGIN, TEND, and instructions before, within, and after the transaction can be performed out-of order. It is even possible (though unlikely) that TEND is executed first, then the entire transaction, and lastly the TBEGIN executes. Program order is restored through the GCT (1032) at completion time. The length of transactions is not limited by the size of the GCT (1032), since general purpose registers (GRs) (1028) can be restored from the backup register file (1024).

During execution, the program event recording (PER) events are filtered based on the Event Suppression Control, and a PER TEND event is detected if enabled. Similarly, while in transactional mode, a pseudo-random generator may be causing the random aborts as enabled by the Transaction Diagnostics Control.

Tracking for Transactional Isolation

The Load/Store Unit (1080) tracks cache lines that were accessed during transactional execution, and triggers an abort if an XI from another CPU (or an LRU-XI) conflicts with the footprint. If the conflicting XI is an exclusive or demote XI, the LSU (1080) rejects the XI back to the L3 (1072) in the hope of finishing the transaction before the L3 (1072) repeats the XI. This "stiff-arming" is very efficient in highly contended transactions. In order to prevent hangs when two CPUs stiff-arm each other, a XI-reject counter is implemented, which triggers a transaction abort when a threshold is met.

The L1 cache directory (1040) is traditionally implemented with static random access memories (SRAMs). For the transactional memory implementation, the valid bits 244 (64 rows×6 ways) of the directory have been moved into normal logic latches, and are supplemented with two more bits per cache line: the TX-read 248 and TX-dirty 252 bits.

The TX-read (1048) bits are reset when a new outermost TBEGIN is decoded (which is interlocked against a prior still pending transaction). The TX-read (1048) bit is set at execution time by every load instruction that is marked "transactional" in the issue queue. Note that this can lead to over-marking if speculative loads are executed, for example on a mispredicted branch path. The alternative of setting the TX-read (1048) bit at load completion time was too expensive for silicon area, since multiple loads can complete at the same time, requiring many read-ports on the load-queue.

Stores execute the same way as in non-transactional mode, but a transaction mark is placed in the store queue (STQ) (1060) entry of the store instruction. At write-back time, when the data from the STQ (1060) is written into the L1 (1040), the TX-dirty bit (1052) in the L1-directory (1056) is set for the written cache line. Store write-back into the L1 (1040) occurs only after the store instruction has completed, and at most one store is written back per cycle. Before completion and write-back, loads can access the data from the STQ (1060) by means of store-forwarding; after write-back, the CPU (Not Shown) can access the speculatively updated data in the L1 (1040). If the transaction ends successfully, the TX-dirty bits (1052) of all cache-lines are cleared, and also the TX-marks of not yet written stores are cleared in the STQ (1060), effectively turning the pending stores into normal stores.

On a transaction abort, all pending transactional stores are invalidated from the STQ (1060), even those already completed. All cache lines that were modified by the transaction in the L1 (1040), that is, have the TX-dirty bit (1052) on, have their valid bits turned off, effectively removing them from the L1 (1040) cache instantaneously.

The architecture requires that before completing a new instruction, the isolation of the transaction read- and write-set is maintained. This isolation is ensured by stalling instruction completion at appropriate times when XIs are pending; speculative out-of order execution is allowed, optimistically assuming that the pending XIs are to different addresses and not actually cause a transaction conflict. This design fits very naturally with the XI-vs-completion interlocks that are implemented on prior systems to ensure the strong memory ordering that the architecture requires.

When the L1 (1040) receives an XI, L1 (1040) accesses the directory to check validity of the XI'ed address in the L1 (1040), and if the TX-read bit (1048) is active on the XI'ed line and the XI is not rejected, the LSU (1080) triggers an abort. When a cache line with active TX-read bit (1048) is LRU'ed from the L1 (1040), a special LRU-extension vector remembers for each of the 64 rows of the L1 (1040) that a TX-read line existed on that row. Since no precise address tracking exists for the LRU extensions, any non-rejected XI that hits a valid extension row the LSU (1080) triggers an abort. Providing the LRU-extension effectively increases the read footprint capability from the L1-size to the L2-size and associativity, provided no conflicts with other CPUs against the non-precise LRU-extension tracking causes aborts.

The store footprint is limited by the store cache size and thus implicitly by the L2 (1068) size and associativity. No LRU-extension action needs to be performed when a TX-dirty (1052) cache line is LRU'ed from the L1 (1040).

In prior systems, since the L1 (1040) and L2 (1068) are store-through caches, every store instruction causes an L3 (1072) store access; with now 6 cores per L3 (1072) and further improved performance of each core, the store rate for the L3 (1072) (and to a lesser extent for the L2 (1068) becomes problematic for certain workloads. In order to avoid store queuing delays, a gathering store cache (1064) had to be added, that combines stores to neighboring addresses before sending them to the L3 (1072).

For transactional memory performance, it is acceptable to invalidate every TX-dirty (1052) cache line from the L1 (1040) on transaction aborts, because the L2 (1068) cache is very close (7 cycles L1 1040 miss penalty) to bring back the clean lines. However, it would be unacceptable for performance (and silicon area for tracking) to have transactional stores write the L2 (1068) before the transaction ends and then invalidate all dirty L2 (1068) cache lines on abort (or even worse on the shared L3 (1072)).

The two problems of store bandwidth and transactional memory store handling can both be addressed with the gathering store cache (1064). The cache (1064) is a circular queue of 64 entries, each entry holding 128 bytes of data with byte-precise valid bits. In non-transactional operation, when a store is received from the LSU (1080), the store cache (1064) checks whether an entry exists for the same address, and if so gathers the new store into the existing entry. If no entry exists, a new entry is written into the queue, and if the number of free entries falls under a threshold, the oldest entries are written back to the L2 (1068) and L3 (1072) caches.

When a new outermost transaction begins, all existing entries in the store cache are marked closed so that no new stores can be gathered into them, and eviction of those entries to L2 (1068) and L3 (1072) is started. From that point on, the transactional stores coming out of the LSU (1080) STQ (1060) allocate new entries, or gather into existing transactional entries. The write-back of those stores into L2 (1068) and L3 (1072) is blocked, until the transaction ends successfully; at that point subsequent (post-transaction) stores can continue to gather into existing entries, until the next transaction closes those entries again.

The store cache (1064) is queried on every exclusive or demote XI, and causes an XI reject if the XI compares to any active entry. If the core is not completing further instructions while continuously rejecting XIs, the transaction is aborted at a certain threshold to avoid hangs.

The LSU (1080) requests a transaction abort when the store cache (1064) overflows. The LSU (1080) detects this condition when it tries to send a new store that cannot merge into an existing entry, and the entire store cache (1064) is filled with stores from the current transaction. The store cache (1064) is managed as a subset of the L2 (1068): while transactionally dirty lines can be evicted from the L1 (1040), they have to stay resident in the L2 (1068) throughout the transaction. The maximum store footprint is thus limited to the store cache size of 64×128 bytes, and it is also limited by the associativity of the L2 (1068). Since the L2 (1068) is 8-way associative and has 512 rows, it is typically large enough to not cause transaction aborts.

If a transaction aborts, the store cache (1064) is notified and all entries holding transactional data are invalidated. The store cache (1064) also has a mark per doubleword (8 bytes) whether the entry was written by a NTSTG instruction—those doublewords stay valid across transaction aborts.

Traditionally, IBM mainframe server processors contain a layer of firmware called millicode which performs complex functions like certain CISC instruction executions, interruption handling, system synchronization, and RAS. Millicode includes machine dependent instructions as well as instructions of the instruction set architecture (ISA) that are fetched and executed from memory similarly to instructions of application programs and the operating system (OS). Firmware resides in a restricted area of main memory that customer programs cannot access. When hardware detects a situation that needs to invoke millicode, the instruction fetching unit 204 switches into "millicode mode" and starts fetching at the appropriate location in the millicode memory area. Millicode may be fetched and executed in the same way as instructions of the instruction set architecture (ISA), and may include ISA instructions.

For transactional memory, millicode is involved in various complex situations. Every transaction abort invokes a dedicated millicode sub-routine to perform the necessary abort steps. The transaction-abort millicode starts by reading special-purpose registers (SPRs) holding the hardware internal abort reason, potential exception reasons, and the aborted instruction address, which millicode then uses to store a TDB if one is specified. The TBEGIN instruction text is loaded from an SPR to obtain the GR-save-mask, which is needed for millicode to know which GRs (1038) to restore.

The CPU supports a special millicode-only instruction to read out the backup-GRs (1024) and copy them into the main GRs (1028). The TBEGIN instruction address is also loaded from an SPR to set the new instruction address in the PSW to continue execution after the TBEGIN once the millicode abort sub-routine finishes. That PSW may later be saved as program-old PSW in case the abort is caused by a non-filtered program interruption.

The TABORT instruction may be millicode implemented; when the IDU (1208) decodes TABORT, it instructs the instruction fetch unit to branch into TABORT's millicode, from which millicode branches into the common abort sub-routine.

The Extract Transaction Nesting Depth (ETND) instruction may also be millicoded, since it is not performance critical; millicode loads the current nesting depth out of a special hardware register and places it into a GR (1028). The PPA instruction is millicoded; it performs the optimal delay based on the current abort count provided by software as an operand to PPA, and also based on other hardware internal state.

For constrained transactions, millicode may keep track of the number of aborts. The counter is reset to 0 on successful TEND completion, or if an interruption into the OS occurs (since it is not known if or when the OS will return to the program). Depending on the current abort count, millicode can invoke certain mechanisms to improve the chance of success for the subsequent transaction retry. The mechanisms involve, for example, successively increasing random delays between retries, and reducing the amount of speculative execution to avoid encountering aborts caused by speculative accesses to data that the transaction is not actually using. As a last resort, millicode can broadcast to other CPUs to stop all conflicting work, retry the local transaction, before releasing the other CPUs to continue normal processing. Multiple CPUs must be coordinated to not cause deadlocks, so some serialization between millicode instances on different CPUs is required.

In today's systems, accurate tracking of transactional read and write sets is difficult if not impossible. When a possibly speculative read access is made, a cache line is indicated to be in the read set. When an event causing discarding of speculative execution occurs, no reset occurs. This is similar, for write sets. Thus, read and write sets for transactions necessarily contain speculative over indication, when a later branch mis-prediction recovery has in fact ejected that (read or write) access from the (read or write) set. Therefore, it may be advantageous to improve the tracking of read and write sets with the pending read and write queues (1082) and (1084), respectively, associated with transactions themselves and allow a processor to recover read and write sets that have been unnecessarily augmented with speculative addresses when a mis-speculation is discovered. As such, according to at least one embodiment.

The components of an example CPU described above in FIG. 10 has been labeled with tools in the form of read and write queues (1080) and (1082). The tools are implemented to manage speculative load and store instructions for tracking processor transaction read and write sets and eliminating speculative mis-predictions. The functionality of the read and write queues (1080) and (1082) for managing transactional execution are shown and described in the flow charts shown in FIGS. 1-9. The queues (1080) and (1082) may be implemented in programmable hardware devices such as field programmable gate arrays, programmable array logic, programmable logic devices, or the like. The queues (1080) and (1082) may also be implemented in software for execution by various types of processors. An identified functional unit of executable code may, for instance, comprise one or more physical or logical blocks of computer instructions which may, for instance, be organized as an object, procedure, function, or other construct. Nevertheless, the executable of the queues (1080) and (1082) need not be physically located together, but may comprise disparate instructions stored in different locations which, when joined logically together, comprise the tools and achieve the stated purpose of the tool.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single data set, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of the embodiment(s). One skilled in the relevant art will recognize, however, that the embodiment(s) can be practiced without one or more of the specific details, or with other methods, components, materials, etc. In other instances, well-known structures, materials, or operations are not shown or described in detail to avoid obscuring aspects.

The present embodiment(s) may be a system, a method, and/or a computer program product. The computer program product may include a computer readable storage medium (or media) having computer readable program instructions thereon for causing a processor to carry out aspects of the present embodiment(s).

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiment(s) may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiment(s).

Aspects of the present embodiment(s) are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to the various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiment(s) has been presented for purposes of illustration and description, but is not intended to be exhaustive or limited to the embodiment(s) in the form disclosed. Many modifications and variations will be apparent to those of ordinary skill in the art without departing from the scope and spirit of the embodiment(s). The embodiment was chosen and described in order to best explain the principles and the practical application, and to enable others of ordinary skill in the art to understand the embodiment(s) for various embodiments with various modifications as are suited to the particular use contemplated. Accordingly, the implementation of the read and write queues corresponding to speculatively executed read and write instructions, respectively, function to resolve transaction interference.

It will be appreciated that, although specific embodiments have been described herein for purposes of illustration, various modifications may be made without departing from the spirit and scope of the invention. In particular, different coherence protocols, coherence granules, tracking granularity of transactional read and write sets other than a cache line may be used. Similarly, but or directory based protocols may be used to communicate. Accordingly, the scope of protection of this invention is limited only by the following claims and their equivalents.

What is claimed is:

1. A computer system comprising:
    a processing unit operatively coupled to memory;
    a tool in communication with the processing unit to track a processor instruction, the tool to:
        maintain a non-speculative indication of a non-speculative instruction stored in a cache unit for a transaction by a first requestor, the non-speculative instruction selected from the group consisting of: a read of data and a write of data;
        maintain a queue of at least one address corresponding to a speculatively executed instruction selected from the group consisting of: a load memory read and a store memory write, the speculatively executed instruction corresponding to a speculative member of a set selected from the group consisting of: a read set and a write set;
        perform a transaction interference resolution responsive to receipt of a request for data by a remote processor, including determine a potential transaction interference exclusively conflicting with the speculatively executed instruction utilizing the queue; and
        hold a response to the received request until the speculatively executed instruction is in a state selected from the group consisting of: committed and flushed.

2. The system of claim 1, wherein to determine the potential transaction interference exclusively conflicting with the speculatively executed instruction further comprises the tool to compare a requested address corresponding to the received request and the address corresponding to the speculatively executed instruction.

3. The system of claim 1, wherein to determine the potential transaction interference exclusively conflicting with the speculatively executed instruction further comprises the tool to compare a first size of the received request and a second size of an operation corresponding to the address corresponding to the speculatively executed instruction.

4. The system of claim 1, further comprising the tool to configure the queue with only a quantity of bits needed to uniquely identify a cache line.

5. The system of claim 1, further comprising the tool to:
determine if the speculatively executed instruction will complete;
if the speculatively executed instruction completes, indicate interference and initiate recovery; and
if the speculatively executed instruction does not complete, indicate non-interference and provide a cache line for the requested access to the remote processor.

6. The system of claim 1, further comprising the tool to notify the remote processor that the response is being deferred, and advance the response in the remote processor responsive to an interference with a speculatively executed instruction of the remote processor when the remote processor has received a deferred response from a local processor.

7. A computer program product for tracking a processor instruction, the computer program product comprising a computer readable storage medium having program code embodied therewith, the program code executable by a processing unit to:
maintain a non-speculative indication of a non-speculative instruction stored in a cache unit for a transaction by a first requestor, the non-speculative instruction selected from the group consisting of: a read of data and a write of written data;
maintain a queue of at least one address corresponding to a speculatively executed instruction selected from the group consisting of: a load memory read and a store memory write, the speculatively executed instruction corresponding to a speculative member of a set selected from the group consisting of: a read set and a write set;
perform a transaction interference resolution responsive to receipt of a request for data by a remote processor, including determine a potential transaction interference exclusively conflicting with the speculatively executed instruction utilizing the queue; and
hold a response to the received request until the speculatively executed instruction is in a state selected from the group consisting of: committed and flushed.

8. The computer program product of claim 7, wherein to determine the potential transaction interference exclusively conflicting with the speculatively executed instruction further comprises program code to compare a requested address corresponding to the received request and the address corresponding to the speculatively executed instruction.

9. The computer program product of claim 7, wherein to determine the potential transaction interference exclusively conflicting with the speculatively executed instruction further comprises program code to compare a first size of the received request and a second size of an operation corresponding to the address corresponding to the speculatively executed instruction.

10. The computer program product of claim 7, further comprising program code to configure the queue with only a quantity of bits needed to uniquely identify a cache line.

11. The computer program product of claim 7, further comprising program code to:
determine if the speculatively executed instruction will complete;
if the speculatively executed instruction completes, indicate interference and initiate recovery; and
if the speculatively executed instruction does not complete, indicate non-interference and provide a cache line for the requested access to the remote processor.

12. The computer program product of claim 7, further comprising program code to notify the remote processor that the response is being deferred, and advance the response in the remote processor responsive to an interference with a speculatively executed instruction of the remote processor when the remote processor has received a deferred response from a local processor.

13. A method for tracking a processor instruction comprising:
maintaining a non-speculative indication of a non-speculative instruction stored in a cache unit for a transaction by a first requestor, the non-speculative instruction selected from the group consisting of: a read of data and a write of written data;
maintaining a queue of at least one address corresponding to a speculatively executed instruction selected from the group consisting of: a load memory read and a store memory write, the speculatively executed instruction corresponding to a speculative member of a set selected from the group consisting of: a read set and a write set;
performing a transaction interference resolution responsive to receiving a request for data by a remote processor, including determining a potential transaction interference exclusively conflicting with the speculatively executed instruction utilizing the queue; and
holding a response to the received request until the speculatively executed instruction is in a state selected from the group consisting of: committed and flushed.

14. The method of claim 13, wherein determining the potential transaction interference exclusively conflicting with the speculatively executed instruction further comprises comparing a requested address corresponding to the received request and the address corresponding to the speculatively executed instruction.

15. The method of claim 13, wherein determining the potential transaction interference exclusively conflicting with the speculatively executed instruction further comprises comparing a first size of the received request and a second size of an operation corresponding to the address corresponding to the speculatively executed instruction.

16. The method of claim 13, further comprising configuring the queue with only a quantity of bits needed to uniquely identify a cache line.

17. The method of claim 13, further comprising:
determining if the speculatively executed instruction will complete;
if the speculatively executed instruction completes, indicating interference and initiating recovery; and
if the speculatively executed instruction does not complete, indicating non-interference and providing a cache line for the requested access to the remote processor.

18. The method of claim 13, further comprising notifying the remote processor that the response is being deferred, and advancing the response in the remote processor responsive to an interference with a speculatively executed instruction of the remote processor when the remote processor has received a deferred response from a local processor.

* * * * *